United States Patent [19]

Chadwick

[11] 3,771,041

[45] Nov. 6, 1973

[54] MARGIN ANGLE CONTROL FOR HVDC CONVERTER HAVING IMPROVED VALVE CURRENT MONITOR

[75] Inventor: Philip Chadwick, Winnipeg, Manitoba, Canada

[73] Assignee: General Electric Company, Philadelphia, Pa.

[22] Filed: Feb. 25, 1972

[21] Appl. No.: 229,359

Related U.S. Application Data

[63] Continuation-in-part of Ser. No. 111,035, Jan. 29, 1971, abandoned.

[52] U.S. Cl. .................................................. 321/5
[51] Int. Cl. ............................................ H02m 7/52
[58] Field of Search........................... 321/5, 18, 27; 307/252 K

[56] References Cited
UNITED STATES PATENTS

| | | | |
|---|---|---|---|
| 3,458,795 | 7/1969 | Ainsworth | 321/5 |
| 3,465,234 | 9/1969 | Phadke | 321/5 |
| 3,466,525 | 9/1969 | Ainsworth | 321/5 |

*Primary Examiner*—William M. Shoop, Jr.
*Attorney*—J. Wesley Haubner et al.

[57] ABSTRACT

A margin angle control for a power converter including a valve current monitor for deriving output electric signals representative of the current conducting interval of the thyristor devices comprising the power converter. An alternating current voltage monitor derives output electric signals representative of the voltages appearing across the respective thyristor devices so that by comparing the cessation of current flow through the respective thyristor devices to the point where the voltage across the device passes through zero potential during reversal of the polarity in the voltage across the respective thyristor device, a measure of the margin angle of the device is obtained. Margin angle signal developing circuits are described responsive to the valve current monitor and the voltage monitor for deriving output margin angle signals representative of the margin angles of the respective thyristor devices in the power converter. A selector circuit is responsive to the margin angle signal developing circuit and selects out that margin angle signal representative of the smallest margin angle. The smallest margin angle signal is then compared in a summing circuit to a first reference margin angle signal to develop an error margin angle control signal for normally controlling operation of the thyristor devices. A comparison circuit is coupled to the summing circuit and is responsive to the error margin angle control signal derived in the summing circuit and to a second reference margin angle signal for detecting severe reductions in the smallest margin angle control signal and deriving a second output control signal that is applied in addition to the first error margin angle control signal for providing fast responding control the operation of the converter. In a preferred embodiment a gain change circuit is included in the normal control regulation loop and is responsive to the error margin angle control signal for reducing the gain of the loop in response to a condition where the detected minimum margin angle is less than the reference minimum margin angle established by the first reference minimum margin angle signal whereby any tendency for the regulating system to overshoot and oscillate about a zero error condition, is minimized. The margin angle control is for use with a three-phase bridge connected converter employing at least six thyristor devices with three sets of two thyristor devices connected as a valve pair for each phase of a three phase supply transformer winding. The valve current monitor comprises a conventional alternating current transformer inductively coupled to each valve pair and includes valve current signal shaping and separating circuits for shaping and separating the signal representative of the conduction intervals of the respective thyristor devices in each valve pair. A delay is introduced with respect to the valve current signals to cause these signals to extend over and include or drown out any spurious overshoot signal pulses induced in the current transformer winding as a result of thyristor turn-off, etc. Compensation of the extended time duration of the valve current signal pulse is then provided for at a later point in the margin angle control.

32 Claims, 12 Drawing Figures

United States Patent [19]
Chadwick
[11] 3,771,041
[45] Nov. 6, 1973
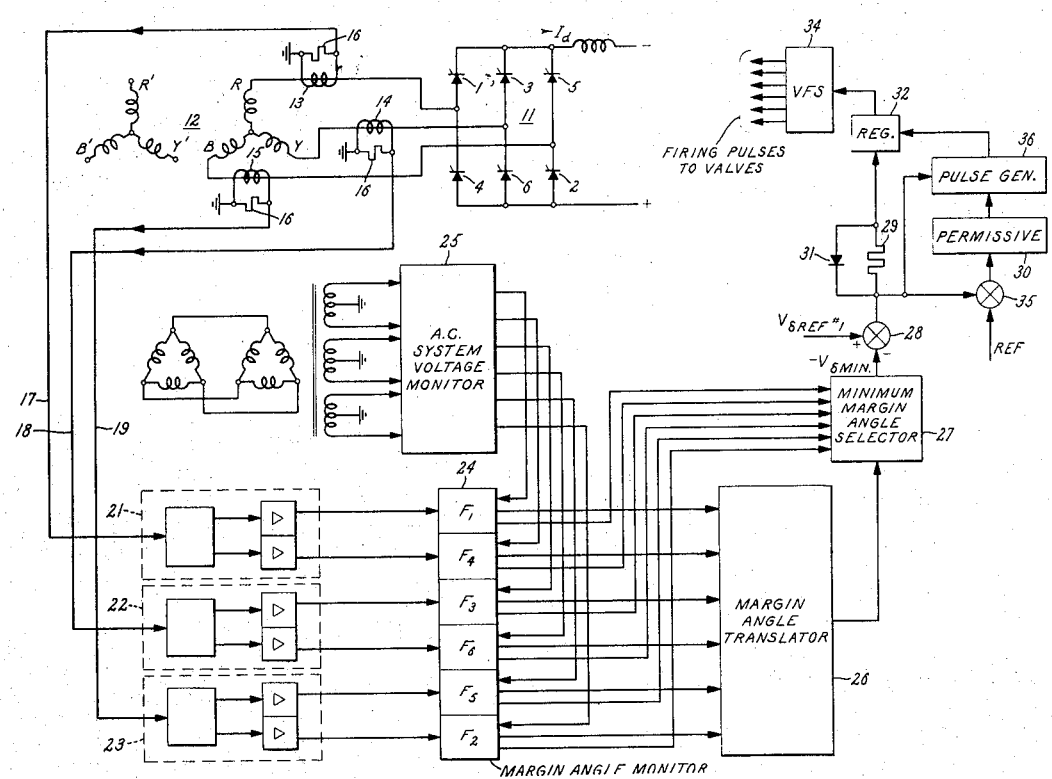

INVENTOR:
PHILIP CHADWICK,
BY Charles W. Helzer
ATTORNEY

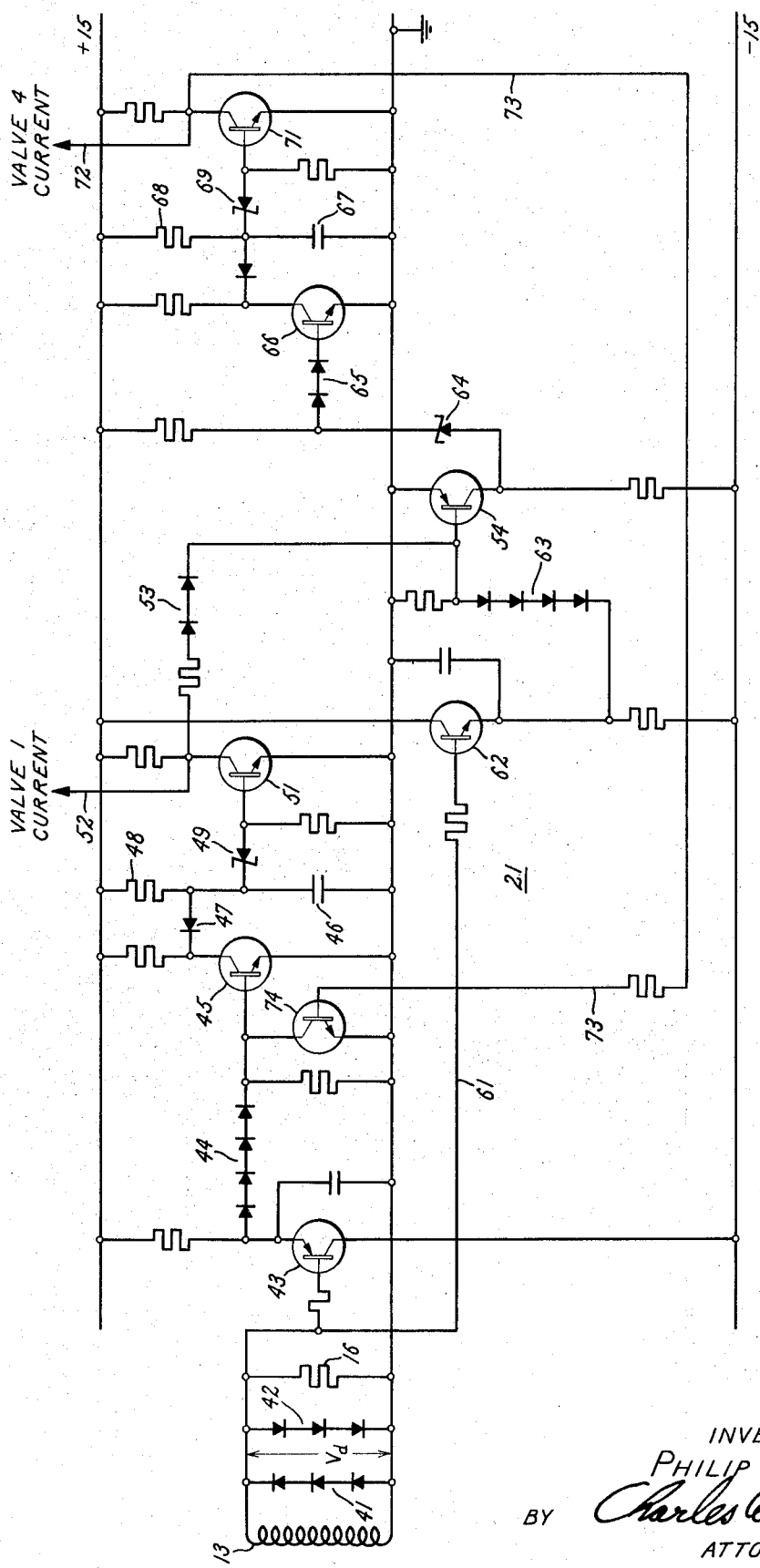

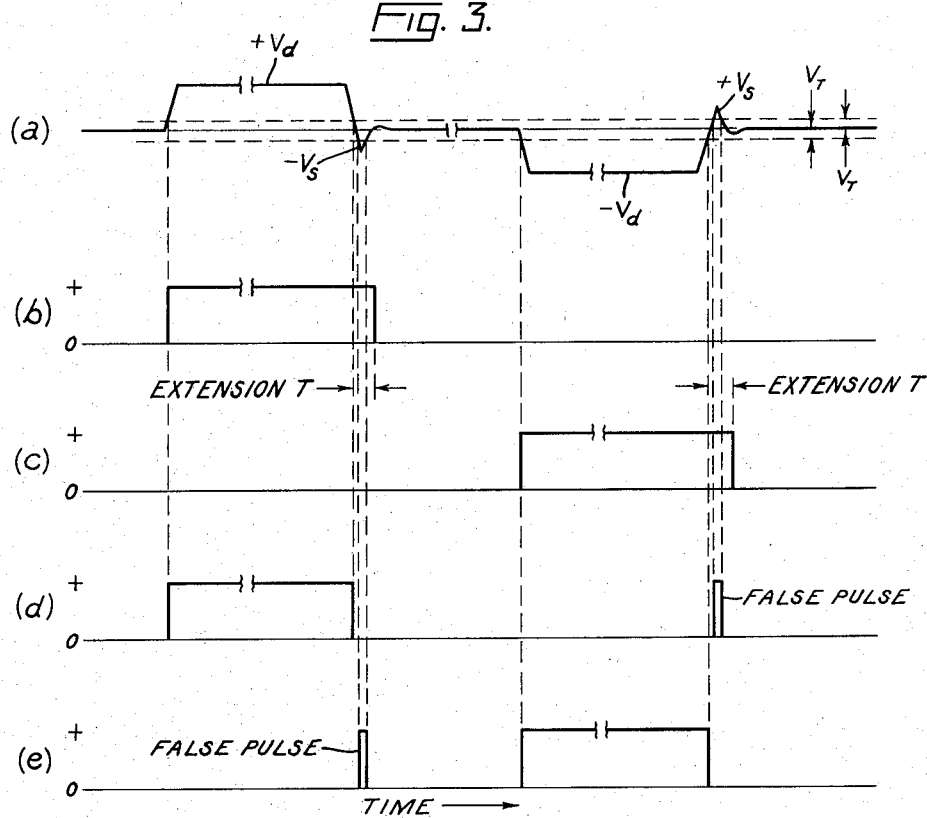
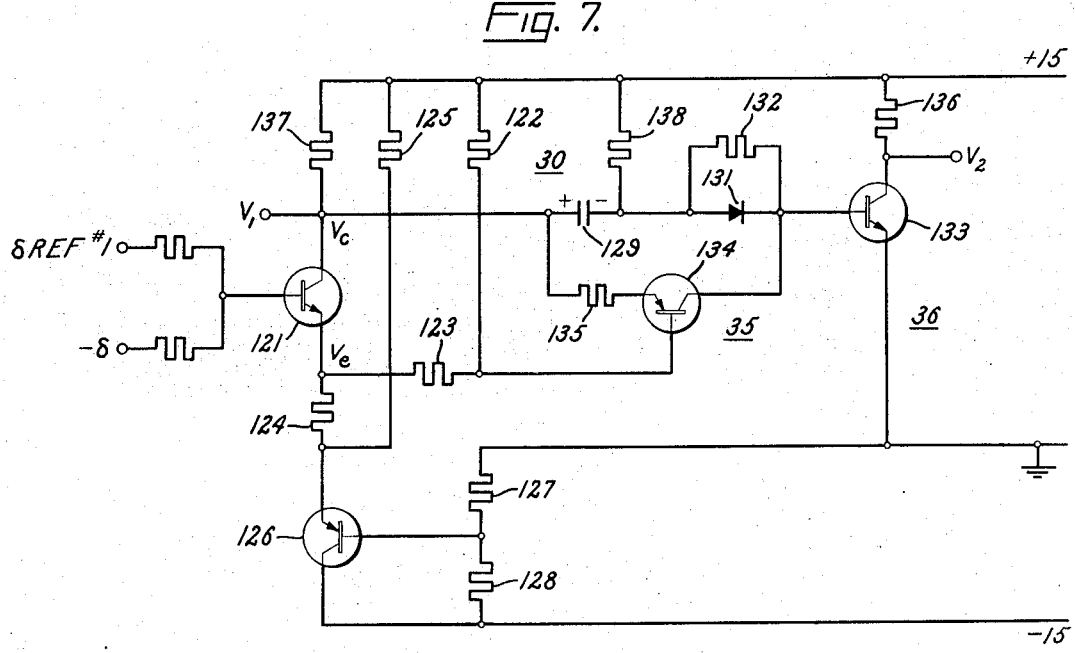

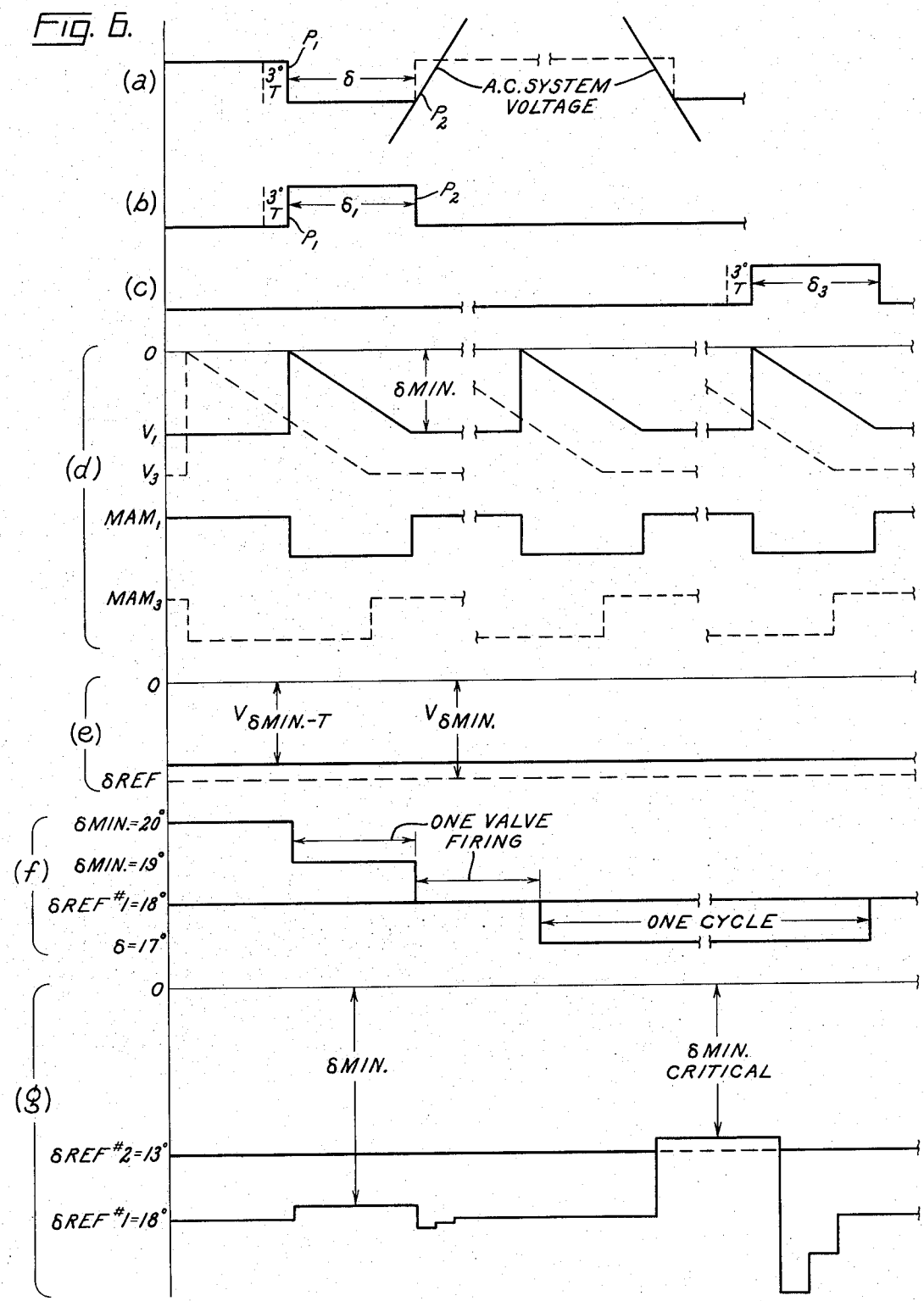

MARGIN ANGLE CONTROL FOR HVDC CONVERTER HAVING IMPROVED VALVE CURRENT MONITOR

CROSS-REFERENCE

This is a continuation-in-part of my prior patent application Ser. No. 111,035 originally filed in the United States on January 29, 1971 and now abandoned.

BACKGROUND OF INVENTION

1. Field of Invention

This invention relates to a new and improved margin angle control method and system for power converter having an improved valve current monitor.

More specifically the invention relates to a fast responding margin angle control for a HVDC power converter for use while operating in the inverting mode and having an improved valve current monitor for sensing conduction intervals of the thyristor valves used in the converter.

2. Background of Invention

The invention is intended primarily for use with HVDC power converters of the three-phase transformer coupled, six valve bridge connected type capable of converting a high voltage direct current to alternating current or alternating current to high voltage direct current dependent on whether it is operated in either the inverting or rectifying mode. However, the invention is in no way limited to such use and can be employed in many other power inverter circuit applications such as reversible rolling mill drives, etc. For a description of known, prior power converters of this general type and the manner of their operation, reference is made to the text books entitled - "High Voltage Direct Current Power Transmission" by C. Adamson and N.G. Hingorani (Garroway Ltd, London, 1960) and "Principles of Inverter Circuits" by B.D. Bedford and R.G. Hoft (Joh Willey and Sons Inc, New York, 1964).

In a paper entitled "A New Constant Extinction Angle Control For AC/DC/AC Static Converters" by N.G. Hingorani and P. Chadwick - IEEE Transactions On Power Apparatus And Systems, Vol PAS-87 No. 3, March 1968, Pgs. 866–872, the applicant has described a prior known margin angle control for use with power converters. In this regard, it should be noted that the terms "margin angle control" and "extinction angle control" are considered to be synonymous in the art, and shall be so treated hereafter. In the above mentioned Hingorani and Chadwick article the authors discuss in detail the purpose and underlying basis for employing margin angle controls in power converters operated in the inverting mode, and reference is made to this article for a more detailed description of the control philosophy and definition of terms. Briefly, however, it should be noted that for safe inverter operation, the angle of advance $\beta$ (the firing angle of the valve in a three-phase bridge connected converter to which commutation proceeds while operating in the inverting mode) must be sufficiently great so that at the end of commutation the interval actually available between the cessation of conduction through the relieved valve until the instant when that valve will again have to withstand a reapplied forward voltage is longer than a predetermined minimum time which is known in the art as the critical deionization time (gaseous ionic tube valve) or reverse recovery time (solidstate semiconductor valve). The interval referred to is commonly called the margin angle $\delta$ of the relieved valve, and as used herein the term "margin angle" is intended to be a measure of time, not degrees. In order to assure that none of the valves in the inverter prematurely breaks down and conducts when its forward voltage is reapplied, means for providing an adequate margin angle have been developed. One such margin angle control means is described in the above-referenced Hinogarani and Chadwick article. Typically these known margin angle controls are arranged to perform a regulating function so that the inverter operates with essentially a constant margin angle which is as small as possible with a suitable margin of safety.

In a number of applications known margin angle regulators do not respond as rapidly or as accurately as may be desired to certain changes in the actual margin angle. To overcome this deficiency the present invention was devised.

SUMMARY OF INVENTION

It is therefore a primary object of the present invention to provide a new and improved, fast responding margin angle control method and system for power converters for assuring safe operation of the converters under conditions where transient disturbances on the AC line might otherwise induce unstable operation.

Another object of the invention is to provide a new and improved, low cost, valve current monitor for use in margin angle control systems for power converters.

A still further object of the invention is to provide a new and improved margin angle control having a gain change feature which reduces the gain of the normal control regulation loop in response to the detected minimum margin angle becoming less than a reference minimum margin angle whereby any tendency for the regulating system to overshoot and oscillate about a zero error condition, is minimized.

In practicing the invention a fast responding margin angle control for a power converter is provided which includes a valve current monitoring means coupled in circuit relationship with the thyristor devices of a power converter for deriving valve current output electric signals representative of the current conducting periods of the respective thyristor devices. Alternating current system voltage monitoring means also are coupled to the thyristor devices for deriving valve voltage output electric signals representative of the voltages appearing across the respective thyristor devices. With this arrangement, the time duration of the interval between the cessation of current conduction through the respective thyristor devices and the positive going passage through zero potential that occurs during the ensuing reversal of the polarity in the voltage across the respective thyristor devices, corresponds to the actual margin angle of the respective thyristor devices. Margin angle signal deriving means are provided and are responsive to the valve current monitoring means and the alternating current system voltage monitoring means for each thyristor device for deriving output margin angle signals representative of the time duration of the margin angles of the respective thyristor devices. A selector circuit means is responsive to the output from the margin angle signal deriving circuit means for selecting that margin angle signal representative of the smallest margin angle. A summing circuit is supplied with the selected smallest margin angle control signal along with a first reference margin angle signal to derive a resultant error margin angle control signal for normally controlling operation of the thyristor devices. A comparison circuit means also is provided and is responsive to the error margin angle control signal and to a second reference signal for detecting severe changes in the smallest angle control signal (such as might be induced by an AC transient disturbance) and deriving a second, additional output error margin angle control signal which is proportional to the magnitude of the error in excess of the first reference. This second output error margin angle control signal is supplied to the control circuit means for the power converter in conjunction with the normal control for exercizing fast responding control over the thyristor devices upon a severe change in the minimum margin angle being detected which exceeds the second reference value. Upon passage of the severe distortion condition, control of the converter is returned to the normal control regulation loop. In one embodiment, a gain change circuit means is included in the normal control regulation loop and is responsive to the error margin angle control signal for reducing the gain of the loop in response to a condition where the detected minimum margin angle is smaller than a predetermined amount established by the first reference minimum margin angle signal, thereby preventing serious overcorrection of errors that reflect subnormal margin angles. Preferably the gain change circuit means is also operative to effect a still further reduction in gain whenever the minimum margin angle is in a range between predetermined first and second angles which are respectively greater than and less than the desired minimum margin angle, whereby any tendency for the regulating system to oscillate about a zero error condition due to a.c. system voltage conditions is minimized.

The improved, fast responding margin angle control is intended primarily for use with a three phase transformer coupled, bridge connected converter employing at least six thyristor devices with three sets of two thyristor devices connected as a valve pair for each phase of the three phase supply transformer winding. The valve current monitoring means comprises a conventional alternating current transformer inductively coupled to each valve pair. Valve current signal shaping and separating circuit means are coupled to the respective current transformers of each valve pair for squarewave-shaping the signal produced thereby and separating the signals into the two separate signals representative of the conduction intervals of each of the respective thyristor devices comprising the valve pair. Delay means are coupled to the respective valve current signal wave shaping and separating circuits for extending the duration of the square wave-shaped electric signals by a predetermined time interval so as to overlap and drown out any spurious overshoot signal pulses induced in the current transformer windings as a result of thyristor turn-off and the like to thereby obviate the production of false and erroneous output valve current conduction indicating signal pulses. At a later point in the margin angle control, compensation for the extended time duration of the valve current squarewave output electric signal pulses is provided.

BRIEF DESCRIPTION OF DRAWINGS

Other objects, features and many of the attendant advantages of this invention will be appreciated more readily as the same becomes better understood by reference to the following detailed description, when considered in connection with the accompanying drawings, wherein like parts in each of the several figures are identified by the same reference character and wherein:

FIG. 2 is a detailed circuit diagram of the valve current signal shaping and separating circuits employed with the improved valve current monitor comprising a part of the invention;

FIG. 3 is a series of current versus time wave-forms illustrating the manner of operation of the circuit shown in FIG. 2;

FIG. 6 is a series of waveforms illustrating the manner of operation of the margin angle monitor, the margin angle translator and the margin angle selector circuits all comprising a part of the new and improved margin angle control circuit shown in FIG. 1;

FIG. 7 is a detailed circuit diagram of a volt-second pulse generator employed in the control of FIG. 1;

DETAILED DESCRIPTION OF PREFERRED EMBODIMENT

Overall Margin Angle Control

Figure 1:
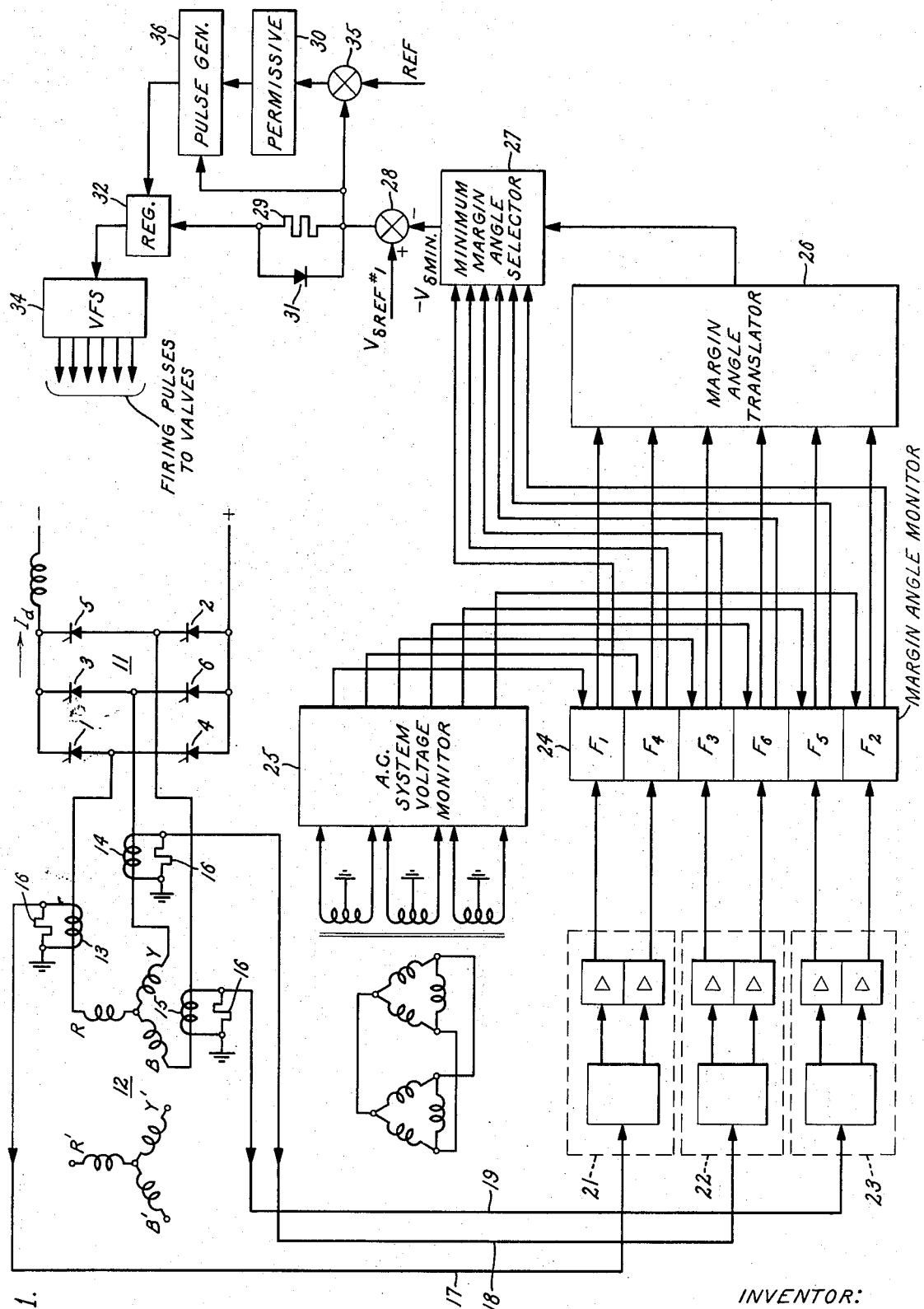
FIG. 1 is a functional block diagram of a new and improved fast responding, margin angle control constructed in accordance with the present invention, and illustrates the same used in conjunction with a three-phase transformer coupled bridge connected HVDC power converter employing six thyristor devices with three sets of two thyristor devices connected as a valve pair for each phase.

FIG. 1 is a functional block diagram of a new and improved, fast responding margin angle control for a power converter constructed in accordance with the invention. A three-phase, transformer coupled, six pulse bridge connected converter employing at least six thyristor valves 1–6 is shown at the upper edge of the drawing at 11. For a more detailed description of the construction and operation of the power bridge 11 reference is made to the above-identified Adamson and Hingorani text. Suffice it to say that the converter comprises a transformer and bridge circuit formed by six thyristor valves connected in alternately conducting pairs with each valve being rendered conducting in the sequence indicated by its reference numeral. The thyristor valves 1–6 are connected in pairs between two direct current conductors and a set of three-phase AC conductors connected to the phase windings R, Y, and B, respectively, in a known manner. The phase windings R, B and Y comprise the three phase windings of a supply/output transformer 12 and are inductively coupled to corresponding primary/secondary windings R', Y' and B' for supplying output alternating current under conditions where the converter is operating in the inverting mode, and for coupling input supply alternating current to the bridge converter while it is operating in the rectifying mode. The thyristor devices 1, 3 and 5 respectively, of each valve pair have their cathodes connected in common through one of the DC conductors and a suitable direct current filter reactor to a DC output/input terminal and the thyristor devices 2, 4 and 6 and have their anodes connected in common through the remaining DC conductor to a second direct current terminal.

The thyristor devices 1-6 preferably comprise solid state semiconductor silicon controlled rectifier devices which are now well known in the art but could comprise thyratrons, ignitrons, mercury arc rectifiers or some other similar, known, grid controlled conducting device having thyristor operating characteristics like the silicon controlled rectifier as is known in the art. Further, while in the instant disclosure, the various thyristor devices (or valves) 1-6 are referred to as a thyristor device (or valve), it should be kept in mind that because of the intended high voltage, large current applications, these devices may in fact comprise a multiplicity of parallel and/or series connected silicon controlled rectifier units, etc interconnected in parallel for large current and in series for large voltage to form the desired individual valves depicted in the circuit arrangement of FIG. 1. Such parallel and/or series interconnection of individual thyristor units to form grid controlled conducting valves of a desired high voltage and current conducting capability is well known in the art and will not be described in detail.

It should be further noted that while the present invention is described and illustrated for use in conjuction with a six pulse bridge circuit it will often be used in practice with a twelve pulse bridge circuit comprised by 12 thyristor devices or valves as defined above. Such a twelve pulse bridge would comprise two series connected six pulse bridges each similar to that shown in FIG. 1 and supplied with suitably phased alternating current potentials from star and delta transformer windings appropriately interconnected to provide a phase displacement of 30° between the respective AC terminals of the two bridges comprising the twelve-pulse converter in a manner well known in the art. If desired, other known multi-pulse power converter arrangements also could be used in practicing the invention.

The new and improved margin angle control is comprised by a number of interconnected subcircuits shown in FIG. 1 including a valve current monitoring means. The valve current monitoring means is comprised by a plurality of conventional, alternating current current transformers (c.t.) 13, 14 and 15 wound around the respective leads connected between the phase windings R, Y and B of the converter transformer and the juncture points of the respective valve pairs 1 and 4, 3 and 6 and 5 and 2. A set of diodes (shown in FIG. 2) provide a back to back load across the secondary windings 13, 14 and 15 in conjunction with a resistor 16. With zero current through the valves, the current in the current transformer primaries will be zero and the voltage across the diodes will be zero. As current is established in the primary of a c.t., voltage rises rapidly across the diodes until such point that the diodes turn fully on (2.8 volts). This results in the production of substantially squarewave-shaped voltage pulses referred to ground. Under normal operating conditions, the voltage signal pulse derived across the diodes of each current transformer will alternate between voltage levels representing $+I_d$ and $-I_d$ referred to ground. FIG. 3A of the drawings illustrates the nature of the $+I_d$ and $-I_d$ signal pulses derived from the respective current transformers. The positive pulse $+I_d$ corresponds to conduction of the common cathode valve such as thyristor device No. 1 in the power converter 11 and the negative pulse $-I_d$ corresponds to conduction of the common anode valve such as No. 4 of valve pair 1 and 4. Within the valve current signal wave shaping and separating circuits 21-23, the positive and negative pulses $+I_d$ and $-I_d$ are separated and shaped so that as each pulse exceeds or falls below a reference or threshold voltage level, the output signals from the waveshaping and separating circuits will assume either a logical one or logical zero state, respectively, and are representative of the conduction intervals of the respective thyristor valves 1-6. These squarewave-shaped signal pulses which are indicative of the current conducting intervals of the respective thyristor valves 1-6, are then supplied as one of the inputs to a margin angle monitor shown generally at 24. The construction and operation of the valve current signal shaping and separating circuits 21-23 will be described more fully hereinafter in connection with FIGS. 2 and 3.

The margin angle monitor 24 in addition to receiving the valve current pulses from the valve current monitoring means, also receives individual rectangular waveform voltage signals corresponding to the appropriate positive half cycle of the respective valve commutating voltages appearing across the valve and obtained from an AC system voltage monitoring means 25. The AC system voltage monitor comprises an auxiliary transformer inductively coupled to the tertiary of the main three phase supply/output transformer of the power converter and having voltage step down, center tapped secondary windings for supplying the respective phase to phase voltage waveform signals to the monitor circuit 25. This circuit processes the voltages in a known manner to produce output, individual, square wave-shaped commutating voltage waveform signals that correspond to the positive half cycle valve commutating voltages appearing across the respective thyristor devices 1-6. These commutating voltage waveform signals then are supplied as a second input to the margin angle monitor 24.

The margin angle monitor 24 comprises six bistable flip-flop circuits, one for each of the six thyristor devices in the power converter bridge. These flip-flop circuits are shown generally at F1, F4, etc in FIG. 1 for generating square wave output electric signals representative of the measured margin angle of the respective associated thyristor device 1-6 in the power converter bridge. The square wave-shaped margin angle electric signals are produced by causing the respective flip-flops, such as $F_1$ in margin angle monitor 24, to switch from a first conducting state to a second conducting state upon receipt of the trailing edge of the valve current pulse (which marks the end of the conducting interval and hence the commencement or start of the margin angle interval). The flip-flop $F_1$ is then switched from its second state back to its first state upon receipt of the input square wave shaped commutating voltage signal supplied from the AC system voltage monitor 25. The leading edge of this square wave shaped AC system commutating voltage signal is indicative of the passage through zero potential in the positive direction that occurs during reversal in polarity of the commutating voltage appearing across the respective thyristor device, and is obtained by sensing the rise in voltage across the nonconducting valve in the valve pair whose associated valve is rendered conductive to commutate off the particular thyristor device in question. For example, valve 3 will be rendered conductive in order to commutate off valve 1 and the rise in voltage across valve 6 is sensed in order to identify the point where valve 1 will become forward biased and thus required to withstand a reapplied forward voltage due to the reversal in polarity of its commutating voltage as is well known to those skilled in the art.

FIG. 6a of the drawings depicts the waveforms of the signals supplied to the margin angle monitor 24, and illustrates the manner of production of the margin angle signal pulses appearing at the output from the margin angle monitor. At some previous point in time (not indicated in FIG. 6a) the next valve in the bridge to which commutation proceeds (assumed to be valve 3) is rendered conductive in accordance with the commanded angle of advance control signal and thyristor valve 1 will start to turn off. Upon the cessation of conduction in the thyristor valve, the valve current monitor signal developed by current transformer 13 and resistor 16 will produce a sharp trailing edge indicated at $P_1$. As mentioned previously, the margin angle is defined as that interval or period left at the end of commutation of a valve after the valve has stopped conducting and prior to the reversal of polarity of the commutating voltage across the valve so that it must withstand a reapplied forward voltage. This margin angle must not be less than the critical reverse recovery time $\alpha_o$ of the thyristor valve which has just stopped conducting, otherwise upon the reapplication of the forward voltage it may break down and conduct out of turn. By causing the flip-flop $F_1$ in the margin angle monitor to again switch back to its initial state upon the passage of the AC system voltage through zero at point $P_2$ in the manner depicted in FIG. 6a, a squarewave output voltage pulse is produced by the flip-flop $F_1$ whose time duration or width corresponds in length to the actual margin angle of the valve measured in degrees that are referred to the phase of the alternating current voltages. Two such pulse width (duration) modulated margin angle control signal pulses are illustrated in FIGS. 6b and 6c wherein the margin angle $\alpha_3$ for the thyristor 3 is shown in FIG. 6c and the margin angle $\alpha_1$ of the thyristor is shown in FIG. 6b.

For maximum efficiency of operation of the power converter it is desirable to operate the thyristor with as small a margin angle (i.e., as close to the critical margin angle defined by the reverse recovery time of the thyristor devices) as is possible consistent with reliable and safe operation of the converter. For this reason the margin angle control systems developed previously all have attempted to control the converter so as to safely operate with the smallest, safe margin angle. One of the difficulties encountered in this effort (and the reason why many of the prior art margin angle controls have been unsatisfactory) is due to the appearance of transient disturbance on the alternating current system. The occurrence of such disturbances can seriously affect the commutating voltage available to commutate off a previously conducting valve. Accordingly, where a critical margin angle set for normal conditions is adequate to assure commutation under such normal conditions, upon the occurrence of a transient disturbance, insufficient commutation voltage may be left thereby causing commutation failure of the thyristor device with its consequent unsatisfactory operation of the power converter. To provide for such contingency, the present invention rapidly senses and responds to changes in the minimum margin angle caused by such transient disturbances, and instantly increases the minimum margin angle to a safe value prior to the firing of the next valve in the bridge. When the transient disturbance passes, the regulator will automatically return the margin angle to the preset reference. The manner in which this is accomplished will be appreciated more fully hereinafter.

In order to select the minimum margin angle, the margin angle signals of all of the thyristor devices 1-6 are supplied to a margin angle translator which converts the pulse width modulated margin angle signals supplied from the flip-flops $F_1$-$F_6$ in the margin angle monitor 24 into margin angle voltage values whose level or magnitude is representative of the respective margin angles of the thyristor devices 1-6. The varying amplitude voltage signals are then supplied as the inputs to a diode OR gate in the input of minimum margin angle selector means 27.

The selected minimum margin angle voltage signal supplied through the diode OR gate to the selector circuit 27 is updated immediately after the margin angle measurement following each thyristor value conduction interval. Thus, for a six pulse bridge, the margin angles are sensed every 60° of the alternating current system voltage waveform, and for a twelve pulse bridge they are sensed every 30°, as will be better understood following a review of the description of the margin angle translator and selector circuits. The minimum margin angle selector circuit 27 also is supplied with suitable blanking signals from the margin angle monitor 24 for processing the selected minimum margin angle signal in a manner to result in a substantially continuous, direct current minimum margin angle control signal shown as $-V_{\delta\, MIN}$ in FIG. 6e whose amplitude is representative of the minimum margin angle. By using this sensed minimum margin angle as the control parameter, safe operation of the power converter in the inverting mode, can be assured.

The selected and corrected, direct current, minimum margin angle control signal $-V_{\delta\, MIN}$ appearing at the output of the minimum margin angle selector circuit 27, is supplied to a first summing junction 28 where it is summed with a first minimum margin angle reference control signal $V_{\delta\, REF\, No.\, 1}$. The first reference control signal $V_{\delta\, REF\, No.\, 1}$ will be determined primarily by the reverse recovery time of the thyristor devices 1-6 but will be adjusted to assure safe operation of the power converter by including some safety factor, etc. (including compensation for the reduction in $V_{\delta\, MIN}$ due to the extension of the measured current conduction interval in the valve current monitor for reasons to be discussed more fully hereinafter). Thus, the sensed value of the minimum margin angle signal $-V_{\delta MIN}$ is compared to a reference minimum margin angle signal established $V_{\delta REF No. 1}$ and any difference in either a positive or negative direction is supplied through a gain adjusting resistor 29, bypassed by a diode 31, to a regulator circuit 32.

The regulator circuit 32 controls a firing time computer 33 (that may comprise a variable frequency oscillator) that in turn controls a valve firing system 34 which generates a family of properly timed control pulses for turning on in numerical sequence the respective thyristor devices 1-6 in power converter 11. Because the construction of the regulator 32, the firing time computer 33 (FTC) and the valve firing system 34 (VFS) may be conventional, known systems and subcircuits, these elements will not be described in detail. It is presently preferred that regulator 32 and the firing time computer 33 both comprise circuits of the type described in a patent application assigned to the General Electric Company (11LA03210-Pollard) pending concurrently herewith. However, any known conventional regulator and firing time computer circuit may be employed as the elements 32 and 33, the only requirement being that they be capable of accepting a varying magnitude direct current control signal of either positive or negative polarity and representative of the error in the sensed minimum margin angle from that established by $V_{\delta REF No. 1}$, and thereafter function in response to the control signal to appropriately advance or retard the firing angles of the individual thyristor devices in the power converter so as to reduce the magnitude of the error towards zero.

In addition to being supplied to control operation of regulator 32 through resistor 29 and diode 31, the error control signal derived from summing junction 28 also is supplied to a second summing junction 35. In the second summing junction 35, the error control signal from 28 is compared with a preset reference value REF. If and when the sensed value of the minimum margin angle signal $V_{\delta MIN}$ equals a second critical value reference signal $V_{\delta REF No. 2}$, the error control signal attains the threshold established by REF, and a permissive circuit 30 then supplies a trigger signal to a pulse generator 36. The pulse generator 36, upon being enabled by permissive circuit 30, supplies a constant high amplitude output control pulse to regulator 32, the width or duration of which is in proportion to the actual error control signal from summing junction 28. Upon being applied to FTC 33 via regulator 32, the effect of this additional control pulse is to increase the firing angle of advance $\beta$ sufficiently so that the margin angle of the next valve to fire will be equal approximately to $\delta_{REF No. 1}$. Because this pulse is in addition to the normal regulation loop provided through summing junction 28, the result will be that after 12 firings (in a 12-pulse converter) or six firings (in a 6-pulse bridge converter) from the point where the actual (sensed) minimum margin angle $\delta_{MIN}$ fell below $\delta REF No. 2$, the actual margin angle $\delta$ will become approximately two times $\delta_{REF No. 1}$ ($2 \times \delta_{REF No. 1}$). The actual margin angle $\delta_{MIN}$ then will be reduced to the value $\delta_{REF No. 1}$ by operation of the normal regulation loop thereby providing a sufficient safe period of operation while the transient disturbance passes.

From the foregoing description it will be appreciated that the present invention in fact incorporates two control loops. As will be described more fully hereinafter, the first control loop in effect samples the conducting interval of each thyristor device in the power converter bridge, compares the sensed actual margin angle of the thyristor device to the margin angles of all of the devices in the bridge, and selects the minimum margin angle as a control parameter for controlling normal operation of the converter. This main or normal control loop while quite adequate to accommodate normal and expected variations in minimum margin angle, may not be capable of overcoming severe transient disturbances which drastically affect the commutating voltage waveshape and hence the available margin angle. In order that the control be capable of responding rapidly to transient disturbances of such a severe nature, a second fast responding loop is provided whereby upon detection of a transient condition that severely reduces the sensed minimum margin angle below a critical value, the normal regulation loop is augmented by the introduction of a second control loop that injects a specially generated control pulse for quickly controlling the operation of the regulator and firing time computer in order to change the firing angle of advance $\beta$ to an increased value for a sufficiently prolonged period to safely accommodate the severe transient disturbance.

FIG. 6f of the drawings illustrates the advantage of the gain adjusting resistor 29 and bypass diode 31 connected in the output of summing junction 28 within the normal control or regulation loop. The parameters of the regulator and associated circuits, excluding the resistor 29, are chosen to give a desired loop gain for margin angle regulation in the event a negative margin angle error signal appears in the output of the summing junction as a result of the magnitude of the minimum margin angle $\delta_{MIN}$ increasing above the reference level. Preferably this gain is sufficiently high so that the regulator is effective to reduce the error to zero within two or three valve firings. As shown in FIG. 6f, consider that the sensed minimum margin angle $\delta_{MIN}$ at some point in the operation, is determined to have a value of 20° referred to the phase of the alternating current voltage waveform. By this is meant, the margin angle extends in the direction of advance (toward $\omega t = \pi/2$) from the normal voltage zero ($\omega t = \pi$) of the commutating voltage waveform for an angular extent of 20° (i.e., $\delta_{MIN}$ extends from 160° - 180°). The FTC 33, under the control of the regulator, progressively retards the firing angle so that at the next valve firing, the sensed minimum margin angle will be reduced by approximately one-half of the initial error, e.g., to 19°, and this occurs within one-twelfth of the cycle of the alternating voltage waveform assuming a 12-pulse power converter. Upon the next valve firing, the firing angle has been retarded enough so that the sensed minimum margin angle is returned to normal as set by the reference $\delta_{REF No. 1}$ (e.g., 18°). Thus, it will be appreciated that for each valve firing, the minimum margin angle $\delta_{MIN}$ is measured and control of the firing of the FTC 33 is adjusted accordingly. To provide for this type of operation the bypass diode 31 supplies the negative error signal that results from an excessively large minimum margin directly to regulator 32 without change in gain, thereby providing a sufficiently fast response to affect subsequent valve firings.

Consider now the situation where the error signal is positive due to the sensed minimum margin angle falling below the first reference $\delta_{REF No. 1}$. This situation is depicted in FIG. 6f at points subsequent to the minimum margin angle having been measured to be 17°. As will be better understood when the minimum margin angle translator and selector circuits are described hereinafter in connection with FIGS. 4 and 5, the value of the sensed minimum margin angle for any given thyristor valve will be retained in the form of a charge on a sensing capacitor for a full cycle of the reference alternating current voltage waveform until the margin angle of that valve is again sampled. Thus, the corrective action that the regulator initiates when a subnormal margin angle is first sensed will continue for a full cycle even though the margin angles of the intervening valves are progressively increasing. The possibility of serious overcorrection in this situation is avoided by the resistor 29 which is effective (the error signal being positive and the bypass diode 31 blocking) to appreciably reduce the gain of the regulator. In a 12-pulse converter the resistor 29 is selected to reduce the loop gain on the order of from 1:5 to 1:12, whereby the firing angle advances at a relative slow rate in response to a positive error signal and the actual margin angle, which is increasing as a result, will only slightly overshoot the reference level by the time the error signal supplied through regulator 32 to the firing time computer 22 is next updated a full cycle after this corrective action was initiated.

FIG. 6 g of the drawings illustrates the manner of operation of the second fast responding control loop provided through summing junction 35. The measured value of the minimum margin $\delta_{MIN}$ is compared with a second critical reference margin angle value established by $\delta_{REF\ No.\ 2}$ where $\delta_{REF\ No.\ 2}$ is approximately two-thirds of $\delta_{REF\ No.\ 1}$. From a consideration of FIG. 6g, it will be appreciated that during normal operation of the margin angle control, the sensed or actual value of the minimum margin angle will vary only slightly above or below the reference level assumed to be 18° representative of the normal margin angle desired for $\delta_{REF\ No.\ 1}$. However, upon the occurrence of a severe transient in the AC system, the sensed minimum margin angle $\delta_{MIN}$ will drop below the reference value of 13° established by $\delta_{REF\ No.\ 2}$ as shown at $\delta_{MIN-CRITICAL}$. Upon this occurrence, the pulse generator 36 will provide an output constant amplitude pulse whose width or duration is proportional to the error of the actual or sensed minimum margin angle below $\delta_{REF\ No.\ 1}$. Upon this output pulse being applied to the FTC 33 via regulator 32 it will cause an increase in advance of the firing angle $\beta$ of the next valve to fire such that the margin angle of the next valve to fire (which occurs within 30° in a 12-pulse bridge converter) will be advanced immediately to a value approximately equal to $\delta_{REF\ No.\ 1}$. This pulse will be in addition to the control signal provided by the normal regulation loop supplied through summing junction 28. As a result, after 12 firings (in a 12-pulse bridge) or six firings (in a 6-pulse bridge) from the point where the minimum margin angle fell below $\delta_{REF\ No.\ 2}$, the minimum margin angle $\delta_{MIN}$ will be approximately equal to two times the difference from $\delta_{REF\ No.\ 1}$. This actual minimum margin angle $\delta_{MIN}$ will then be reduced to the value $\delta_{REF\ No.\ 1}$ through normal operation of the control regulation loop provided through summing junction 28. In the interim, the minimum margin angle $\delta_{MIN}$ will have been held at an increased value for a sufficient period to assure safe converter operation until the transient condition passes.

Valve Current Monitor

FIG. 2 is a detailed circuit diagram illustrating the construction of one of the valve current monitors comprised by the current transformer winding 13 and the waveshaping and signal separating circuit 21. It should be understood that the remaining valve current monitors are similar in construction and operation to that shown in FIG. 2 and hence only one of the current monitors will be described in detail. Current flowing in either one of the thyristor devices 1 or 4 of the valve current pair monitored by winding 13, will produce either a positive polarity or a negative polarity voltage pulse across the respective sets of series connected diodes 41 and 42 which act as a back to back load across the secondary winding 13 in conjunction with resistor 16. The diodes 41 and 42 operate to shape the voltage signals into substantially square wave-shaped pulses shown in FIG. 3 of the drawings which alternate between positive and negative voltage values representing $+I_d$ and $-I_d$ referred to ground. The positive pulse $+I_d$ corresponds to the conduction of the thyristor 1 and the negative pulse $-I_d$ corresponds to conduction through the thyristor 4.

The positive pulse $+I_d$ is supplied to the base of a PNP transistor 43 connected as an emitter-follower, and its emitter is raised to a positive value that causes an NPN transistor 45 to be turned on via a string of diodes 44 which establish a threshold voltage level. The diodes 44 serve to establish a threshold voltage level shown as $+V_t$ in FIG. 3a of the drawing for screening out small undesired background noise signals that normally are induced in the current sensing winding 13 and small DC components (which are present in the a.c.c.t. secondary under transient conditions causing rapid changes in angle of delay $\alpha$), and which otherwise might cause a false response in the valve current monitor. A capacitor $C_1$ coupled from the emitter of transistor 43 to ground limits frequency response of the circuit to 250 Kc/sec and also improves noise immunity.

Upon transistor 45 being turned on capacitor 46 is discharged through a diode 47, and NPN transistor 51 turns off. Upon transistor 51 being turned off, an essentially square wave, positive polarity output signal pulse is supplied over an output conductor 52 which is representative of the forward current conduction interval of the thyristor valve No. 1. In addition, this positive polarity output signal is supplied over a conductor 53 and a pair of series connected diodes to the base of a PNP inverting transistor 54 for maintaining the base of this transistor reverse-biased thereby inhibiting or assuring against the production of an output signal pulse in the opposite polarity signal shaping and separating channel during the current conducting intervals of thyristor valve 1.

When thyristor valve 1 ceases to conduct, the diodes 42 become non-conducting and the emitter of transistor 43 is lowered in potential to approximately ground. As a result, transistor 45 turns off and instantaneously diode 47 is reversed biased and capacitor 46 is charged positively via resistor 48. Upon reaching the threshold voltage of a Zener diode 49 (plus the $V_{be}$ of transistor 51), transistor 51 is turned-on and the output voltage over conductor 52 drops to zero volts.

Upon termination of conduction of the thyristor valve 1, a negative going spurious voltage spike is produced such as shown at $-V_s$ in FIG. 3a. A similar positive going voltage spike $+V_s$ is produced at the termination of conduction of the thyristor valve 4 again due to turn-off of the valve. Because these undesired voltage spikes could produce erroneous or false indications of conduction of the opposite valve in the pair as depicted in FIGS. 3d and 3e, some means must be provided for preventing their being transmitted through to the control as an indication of valve conduction. For this purpose, the RC time constant of the charging capacitor 46 and resistor 48 and the threshold established by Zener diode 49 and the $V_{be}$ of 5, is adjusted to cause the width or duration of the square wave pulse produced on output conductor 52 to extend an additional period T shown in FIGS. 3b and 3c. As a consequence, the output pulse overlaps and drowns out the undesired spurious or erroneous signal pulse that otherwise would be produced as a false indication of valve conduction in the manner shown in FIGS. 3d and 3e. By thus extending the duration of the true output current indicating signal pulses, the control will never sense and act upon the undesired spurious signal pulses. At a later point in the control, as will be described hereinafter, an appropriate compensation is made for the extended duration T of the valve current pulses shown in FIGS. 3b and 3c.

The processing of the negative going pulse $-I_d$ representative of the current conducting intervals of thyristor valve 4 is complementary to that for the positive going pulse. The negative going pulse $-I_d$ appearing across diode string 41, is supplied over conductor 61 to the base of a NPN transistor 62 connected as an emitter-follower whose emitter is driven sufficiently negative to apply a negative bias to the base of transistor 54 from the $-15$ volt terminal through a diode string 63, and render 54 conductive. The series connected string of diodes 63 establishes the threshold value $-V_t$ which must be exceeded by a sensed current signal and serves the same purpose as the diodes 44 in the opposite channel. Turn on of the PNP transistor 54 raises its collector sufficiently to turn on transistor 66 through Zener diode 64. Turn on of 66 then operates in a similar manner as turn on of transistor 45 in the opposite channel with respect to the remainder of the circuitry comprised by capacitor 67, resistor 68, Zener diode 69 and NPN transistor 71 to produce at collector of transistor 71 a positive going output voltage pulse such as shown in FIG. 3c and representative of the current conducting intervals of thyristor valve 4. The positive polarity is obtained through the inversion and level shifting provided by transistor 54 and Zener diode 64.

Simultaneously with the production of the output voltage pulse, an inhibiting turn off signal is supplied back over a conductor 73 to the base of a NPN transistor 74 to maintain this transistor turned-on. Transistor 74 is connected to the base of the transistor 45 in the opposite, valve 1 current sensing channel and maintains transistor 45 off for the current conducting interval of thyristor valve 4 plus the extension period T. With the transistor 45 maintained off, the transistor 51 will be maintained on to prevent the production of an output signal pulse in the thyristor valve 1 current indicating circuit. It will be appreciated therefore that during the conduction of thyristor valve 1 a valve current conduction indicating signal pulse shown in FIG. 3b will be produced on the output conductor 52 which is representative of the current conducting interval of this valve (plus the extension T provided to drown out the spurious turn-off signal pulse) and output from the opposite valve No. 4 current indicating circuit is positively prevented due to the inhibiting signal provided via the cross-coupling means which is operative whenever the valve No. 1 output is being produced to keep the transistor 54 turned off. Similarly, upon the production of an output signal pulse supplied over the conductor 72 which is indicative of the forward current conducting interval of valve 4 plus the extension T, an inhibiting signal is fed back over the conductor 73 to prevent the production of an output current pulse in the valve 1 channel.

The valve current monitor just described and shown in FIG. 2 will satisfactorily perform its intended function under all normal steady state conditions. An unusual condition has been found, however, during which the valve current monitor might produce unwanted output signal pulses. This condition can exist when the firing angle of the respective valves comprising the converter bridge is in the vicinity of 90°, as is the case during a power reversal when the mode of operation of the converter is in transition between rectifying and inverting. When the valves are commutating or switching at firing angles of approximately 90°, large and abrupt changes in the magnitude of commutating voltage are cyclically experienced by the nonconducting valves of the bridge. For example, during the gap between the conducting intervals of the complementary valves 1 and 4, the voltage across one of these nonconducting valves is subject to such change. As a result of this large step change in voltage, the snubber circuit which, in accordance with conventional practice in the art, is connected across the valve can contribute enough current to appear to the valve current monitor as though the turned-off valve were conducting.

Any signal pulse induced in the secondary of the current transformer 13 as a result of snubber current will have a relatively short duration, and in order to prevent a false or erroneous valve current conduction indicating signal from being produced in response thereto, I presently prefer to include in the previously described current monitor suitable means for delaying the start of any output signal until the pulse induced in the current transformer windings has persisted for a predetermined length of time. As a consequence of including such delay means, the valve current monitor is able to discriminate between short-term extraneous signals and true valve current conducting signals in the C.T. secondary. One circuit well suited for this purpose is shown in FIG. 12 which illustrates the presently pertinent parts of only the valve No. 1 half of a current monitor otherwise the same as is shown in FIG. 2, it being understood that a corresponding modification of the valve No. 4 channel is intended.

Figure 12:
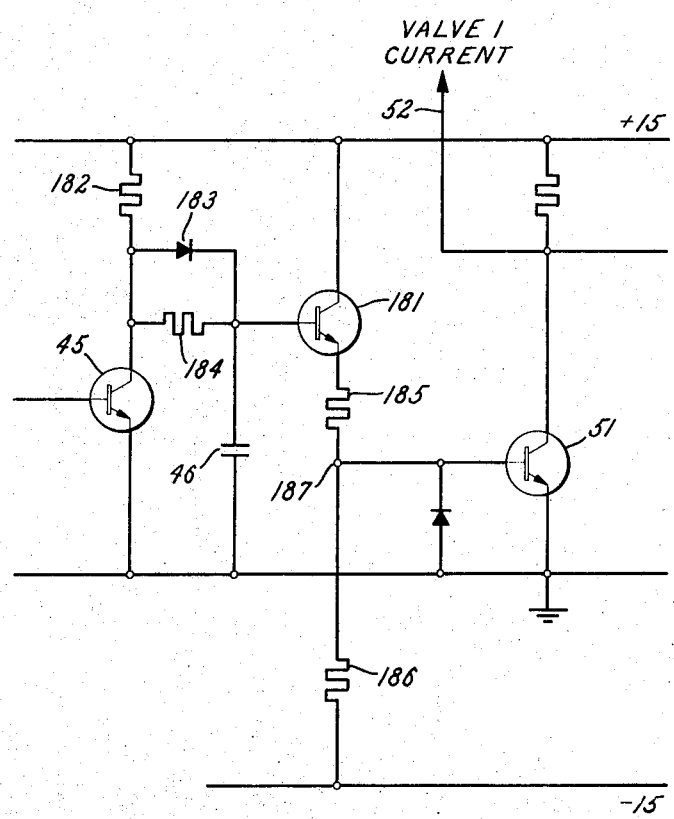
FIG. 12 is a circuit diagram of modifications for part of the valve current monitor shown in FIG. 2.

As can be seen in FIG. 12, an emitter follower stage comprising an NPN transistor 181 is added between the previously described transistors 45 and 51. The base of the transistor 181 is connected to the non-grounded plate of the capacitor 46. The charging circuit for capacitor 46 comprises a resistor 182 and a diode 183, and the discharging circuit for this capacitor comprises a resistor 184 and the transistor 45. The emitter of transistor 181 is connected to the -15 volt control power terminal via a voltage divider comprising resistors 185 and 186 whose common point 187 is connected directly to the base of the transistor 51. So long as the capacitor 46 is charged in excess of a preset threshold level, the potential at point 187 is sufficiently positive to forward bias the transistor 51 which clamps the conductor 52 to ground. Whenever the voltage across capacitor 46 is below the preset value, point 187 is lowered in potential to approximately ground and the transistor 51 is turned off, resulting in the production at conductor 52 of the positive polarity output signal which is representative of the forward current conduction interval of the thyristor valve No. 1.

In operation, upon the commencement of a relatively positive signal at the base of the transistor 45, this transistor is turned on and the previously charged capacitor 46 is discharged through the resistor 184. After a predetermined length of time, the voltage on the capacitor 46 will decay to the aforesaid preset value which results in transistor 51 being turned off. This predetermined time delay, which depends on the ohmic value of resistor 184, delays the start of the output signal at 52 until the relatively positive signal on the base of 45 has persisted for a corresponding length of time. In one embodiment of my invention the parameters have been selected so that this predetermined length of time is approximately 160 microseconds. Later, at the end of the valve 1 forward current conducting interval, the relatively positive signal applied to the base of the transistor 45 will terminate and the circuit shown in FIG. 12 is operative to extend the duration of the output signal at 52 by a predetermined amount which depends on the RC time constant of the charging circuit for capacitor 46. The ohmic value of resistor 182 can be made the same as that of resistor 184, whereby the extension T of the output signal is approximately 160 microseconds. In this event the output signal duration is just equal to the forward current conducting interval of valve No. 1.

As a result of the delay introduced in the start of the output signals produced by the circuit shown in FIG. 12, the modified valve current monitor is immune to shortterm extraneous signals induced in the secondary of the current transformer 13. Since this performs the same function as the previously described capacitors which in FIG. 2 are shown connected between the emitters of the transistors 43 and 62 and ground, these capacitors can, of course, be omitted if desired.

Margin Angle Translator

Figure 4:
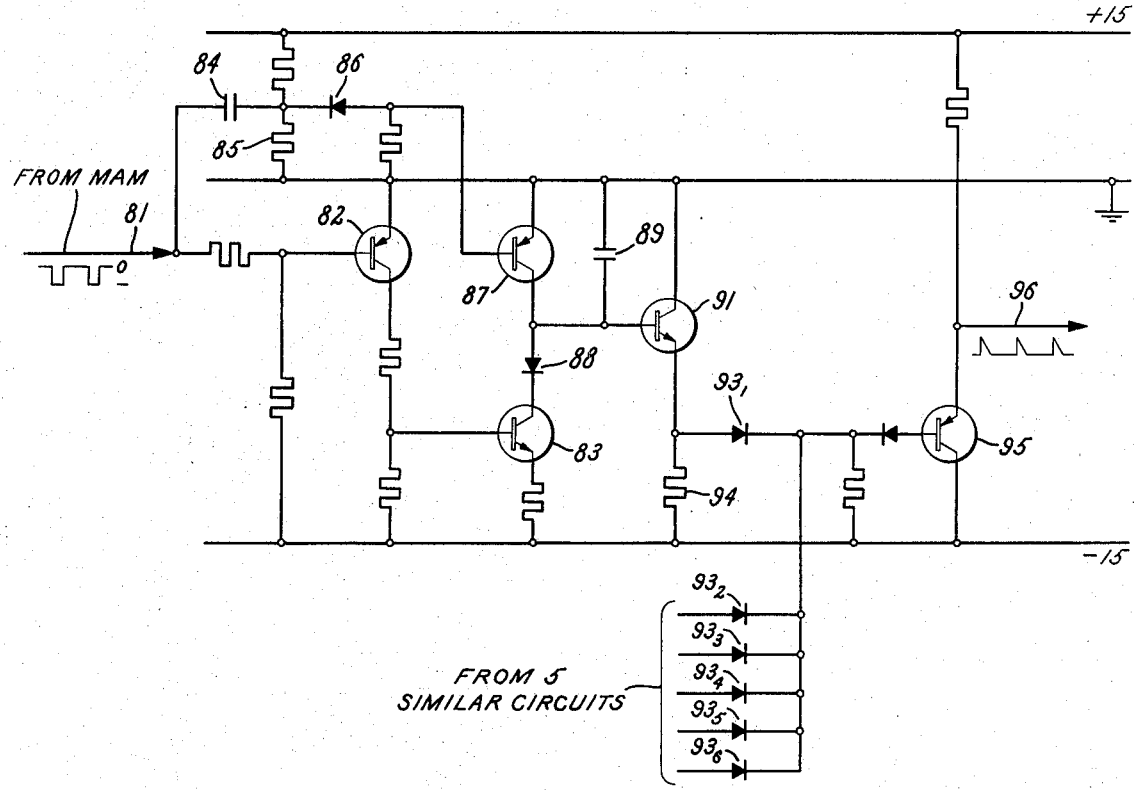
FIG. 4 is a detailed circuit diagram of a preferred form of construction of a margin angle translator circuit comprising a part of the margin angle control shown in FIG. 1.

FIG. 4 is a detailed circuit diagram of the construction of the margin angle translator. The squarewave-shaped margin angle signal pulses produced in the margin angle monitor by the respective flip-flops $F_1 - F_6$ are supplied to a respective associated margin angle translator circuit similar to that shown in FIG. 4 of the drawings. As earlier stated in connection with FIG. 1 of the drawings, the squarewave-shaped margin angle signal pulses are produced by causing a respective flip-flop, such as $F_1$, to change its state at the termination of conduction through its respective thyristor valve 1, and to change back to its original state upon the reversal in polarity of the commutating voltage across the valve at the point where the commutating voltage passes through zero. This interval is by definition the margin angle and will be width modulated (duration modulated) in accordance with the particular margin angle of the associated thyristor valve. The circuit of FIG. 4 converts this duration modulated squarewave-shaped signal into a corresponding negative polarity, sawtoothed-notch wave form output signal whose amplitude corresponds to the pulse width of the input square wave margin angle signal, and hence to the margin angle of the particular thyristor valve in question.

For the above purpose, the input margin angle monitor square wave signals MAM are supplied over a conductor 81 to the base of an input PNP transistor 82. During each negative going interval of the input squarewave margin angle signal transistor 82 will be rendered conductive, and in turn will result in turning on an NPN transistor 83 for the duration of the margin angle pulse. The NPN transistor 83 comprises a constant current source for charging a charging capacitor through a diode 88 from the −15 volt terminal.

The input squarewave-shaped margin angle signal supplied over conductor 81 also is applied through a differentiating circuit comprised by a capacitor 84 and resistor 85 through a coupling diode 86 to the base of a PNP transistor 87. Differentiation of the input margin angle signal pulses results in the production of a negative going voltage spike at the leading edge of the margin signal pulses which cause a PNP transistor 87 to be rendered conductive for only an instant at the beginning of each margin angle signal pulse. The transistor 87 is connected across the charging capacitor 89 so that this instantaneous period of conduction serves to discharge the charging capacitor 89 at the beginning of each sample interval. Thus, there will be no carry over of the charge built up on the charging capacitor 89 from one sampling cycle to the next and the margin angle remaining after each conduction interval will be freshly sampled for each cycle.

From the preceding discussion, it will be appreciated that at the beginning of each margin angle signal pulse, the charging capacitor 89 will be instanteously discharged, and thereafter, following turn-off of the clamping transistor 87, will be charged by the constant current source comprised by transistor 83 through didode 88 to a voltage level corresponding to the duration or width of the margin angle signal pulse. The voltage level or amplitude to which the charging capacitor 89 is charged during the margin angle pulse by constant current source 83, will be trapped on capacitor 89. This voltage is supplied to the base of an output emitter follower amplifier comprised by NPN transistor 91 having an output load resistor 94. The load resistor 94 of the output emitter follower amplifier 91 in the margin angle translator circuit of FIG. 4 in conjunction with an OR gate diode $93_1$ coacts with corresponding OR gate diodes $93_2 - 93_6$ and their associated load resistors from the five margin angle translator circuits (each similar to that shown in FIG. 4) for the remaining valves in the 6-pulse bridge converter and operates to select that margin angle signal which is of the least value and hence corresponds to the minimum margin angle desired to be used as the control parameter for the margin angle control of FIG. 1.

FIG. 6d of the drawings best depicts the manner of operation of the margin angle translator shown in FIG. 4 and how the diode OR gate $93_1 - 93_6$ operates to select out the desired minimum margin angle signal. In FIG. 6d, the solid line curve $V_1$ is intended to depict the build-up of charge on the charging capacitor 89 of the margin angle translator for thyristor valve 1 in the previously described manner. Thus, it will be seen that $V_1$ initially will be discharged to zero value due to the discharge action of transistor 87 at the beginning or leading edge of the margin angle signal pulse. Thereafter, the charging capacitor 89 will be charged to a voltage level by the constant current source 83 through diode 88 to a magnitude or voltage level determined by the duration or width of the margin angle signal pulse indicated as $MAM_1$. Comparing this sawtoothed-notched waveform voltage level signal to the similarly-shaped waveform in dotted line indicated as $V_3$, it can be seen that for the longer duration margin angle signal pulses, such as $MAM_3$ shown in dotted outline form, the charging capacitor will be charged by the constant current source 83 for a longer period, and hence will be charged to a greater magnitude (i.e., to a more negative value). Thus, when the multiplicity of voltage level signals are compared in the diode OR selection gate, $93_1 - 93_6$, that signal having the minimum voltage value indicated as $\delta_{MIN}$ in FIG. 6d will be selected by the gate as corresponding to the minimum margin angle available in the bridge converter. This minimum margin angle signal is supplied through a diode to an emitter follower output stage comprised by a PNP transistor 95 that compensates for the drop across diode 93 and provides a lower circuit output impedance. The output signal appearing at the emitter of transistor 95 is supplied over an output conductor 86 to the margin angle selector circuit shown in FIG. 5.

Margin Angle Selector

Figure 5:
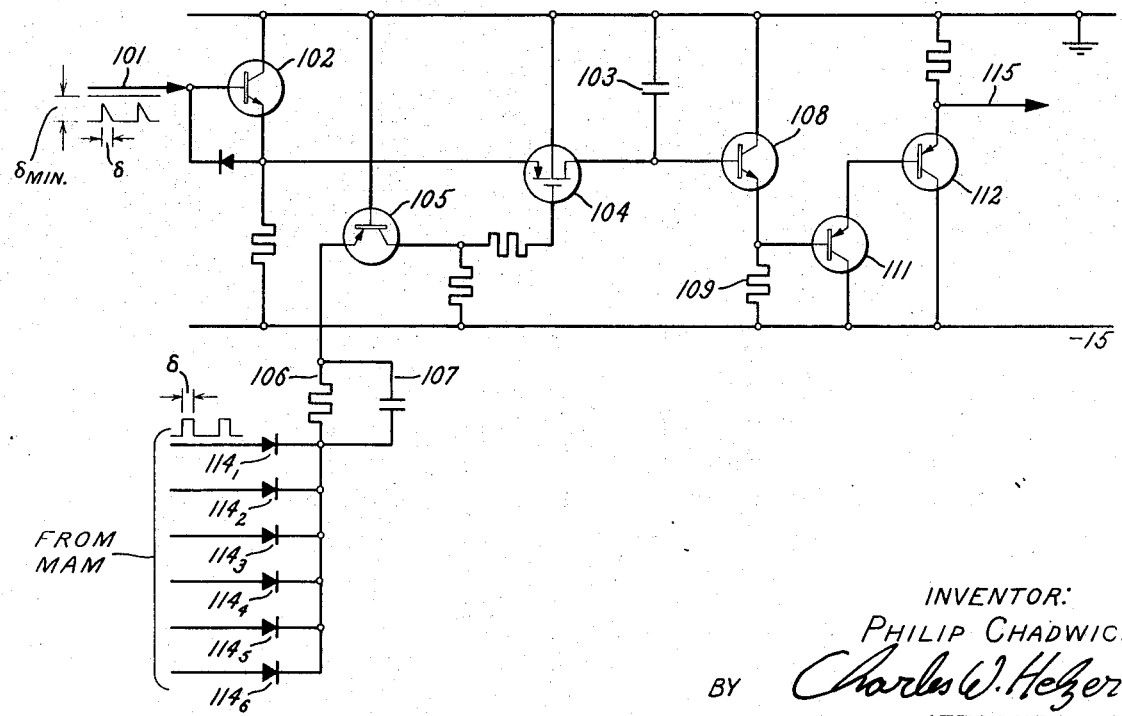
FIG. 5 is a detailed circuit diagram of a preferred form of margin angle selector circuit for use with the margin angle control of FIG. 1.

The margin angle selector circuit shown in FIG. 5 has supplied to its inputs the minimum margin angle control signal obtained from the margin angle translator and blanking signals supplied from the margin angle monitor.

The margin angle selector accepts the sawtooth or 'V' notched output signal from the margin angle translator, and by means of coordinating a sample hold feature with the summation of the blanking pulses supplied from the margin angle monitor, restores this 'V' notched waveform to a pure DC level (under steady state conditions) proportional to measured margin angle. For this purpose, in the margin angle selector, the 'V' notched minimum margin angle signal is supplied over a conductor 101 to a transistor 102 that is a 'low' impedance emitter follower drive for a storage capacitor 103. Transistor 102 is coupled to capacitor 103 through a switching transistor 104. Transistor 104 is a bi-directional switch operated from the summation of the blanking pulses of the margin angle monitor supplied via a level shifting transistor 105 having its emitter connected through a lead network 106, 107 to a plurality of coupling diodes 114, through $114_6$ that supply the respective MAM blanking signals.

When sampling of a margin angle is not taking place, the emitter of tansistor 102, follows the flat topped portion of the signal shown in FIG. 3d corresponding to the smallest margin angle. At this time, the summation blanking input from an appropriate one of the MAM blanking diodes $114 - 114_6$ is in a zero state, causing transistor 105 to be held off and switching transistor 104 to be held on. Thus capacitor 103 rapidly assumes the emitter voltage of transistor 102 corresponding to the minimum margin angle. However, the instant that sampling of a margin angle takes place, transistor 105 is rapidly turned on via lead network 106 and 107, and transistor 104 is turned off. During this interval capacitor 103 holds its voltage while the emitter of 102 continues to follow the 'V' notched margin angle translator input throughout the sampling interval.

At the end of the margin angle interval transistor 105, is again turned off due to the MAM blanking signal dropping to zero, transistor 104 switches on and capacitor 103 rapidly assumes the new value of emitter voltage of transistor 102, corresponding to the new smallest margin angle (should this be different than it previously was).

The minimum margin angle stored on capacitor 103 is read out by an emitter-follower transistor 108 that provides a high input impedance load on capacitor 103 to minimize leakage of charge during the margin angle sampling interval. In addition, where the summation blanking pulses all overlap for $\delta$ greater than 60°, emitter follower 108 ensures that capacitor 103 will charge towards $-15$ volts indicating a smallest margin angle greater than is necessary for the region of margin angle control of an inverter. The emitter of transistor 108 is connected to a pair of PNP transistors 111 and 112 that provide a low output impedance drive to the regulator from the selector circuit over output conductor 115 and in addition compensate for base to emitter voltage drops of transistors 102 and 108.

It should be noted at this point in the description that if a 12-pulse bridge converter configuration is being controlled, the output signal appearing over conductor 115 would be OR gated with the corresponding minimum margin angle signal selected from the other six pulse bridge array. The OR gate would then operate to select which minimum margin angle of the two interconnected six pulse bridge converters was the least, and select that one which was in fact the minimum margin angle present in the overall 12 pulse bridge converter. This last mentioned selected minimum margin angle signal would then be the one which would be supplied to the summing junction 28 in FIG. 1 as the selected minimum margin angle control signal for use in controlling operation of the 12 pulse bridge converter.

The value of the reference margin angle signal $V_{\delta\ REF\ No.\ 1}$ which is supplied to the summing junction 28 for comparison with the selected minimum margin angle signal is adjusted to compensate for the extended duration T of the valve current pulses. For reasons explained hereinbefore, the margin angles that the translator 26 measures will be smaller than the actual margin angles by the period T. The error is constant, and as is illustrated in FIG. 6e it is offset or compensated for by selecting a reference signal magnitude less than the desired value by an amount equivalent to this error.

Fast Responding Control Pulse Generator

FIG. 7 is a detailed circuit diagram of the construction of a volt-second pulse generator circuit 36, the second summing or comparison circuit 35, and the permissive circuit 30 comprising a part of the overall margin control system shown in FIG. 1 of the drawings. As shown in FIG. 7, the input selected minimum margin angle signal V-$\delta$ and the first reference minimum margin angle signal $V_{\delta\ REF\ No.\ 1}$ are summed together at the base of NPN transistor 121. Appropriate bias potentials are supplied to the emitter of transistor 121 through a set of voltage dividing resistors 122, 123, and 124, a resistor 125 and a voltage stabilization circuit comprised by a transistor 126 and a pair of voltage dividing resistors 127 and 128. The circuit is adjusted so that the voltage ($V_c$) appearing at the collector of transistor 121 is proportional to the difference or error between the selected minimum margin angle signal V-$\delta$ and the first reference minimum margin angle signal $V_{REF\ No.\ 1}$.

This voltage $V_c$ is supplied to one plate of a capacitor 129 having its remaining plate connected through a diode 131 bypassed by a resistor 132 to the base of an NPN transistor 133. The base of transistor 133 also is connected to the collector of a PNP transistor 134 having its base connected to the juncture of the voltage dividing resistors 122 and 123, and having its emitter connected through a resistor 135 to the collector of transistor 121.

The collector of transistor 133 is connected through an output load resistor 136 to the plus 15 volt power supply terminal which is connected through resistor 137 to the collector of transistor 121 and through resistor 138 to the juncture of capacitor 139 and diode 131. A $V_2$ output signal is obtained from the collector of transistor 133 under conditions where the error signal $V_1$ appearing at the collector of transistor 121 exceeds a preset reference established by voltage dividing resistors 122 and 123. This second output error signal $V_2$, which appears at the collector of transistor 133 and is supplied to the regulator 32 of FIG. 1 in addition to the normal control regulating error signal $V_1$, will first appear when $V_{-\delta}$ attains a value equal to the previously mentioned $V_{REF\ No.\ 2}$, and its duration is then determined by the magnitude of the error signal $V_1$.

In operation, the circuit is adjusted such that the transistors 133 and 134 are normally conducting under conditions where the main or normal error control signal $V_1$ is close to zero or within the normal regulating range. Under these conditions, the capacitor 129 will be charged to a value $V_c$ proportional to that of the output error signal $V_1$. In the event of a severe AC system transient disturbance which causes the selected minimum margin angle signal to exceed the second preset reference $V_{REF\ No.\ 2}$ (established by voltage dividing resistors 122 and 123), transistors 134 and 133 will be turned off. Upon this occurrence, the collector of transistor 133 is raised positively to a relatively high constant value thereby producing a positive polarity output signal voltage $V_2$ that is supplied to the regulator 32 of FIG. 1 in conjunction with and in addition to the normal $V_1$ regulating signal. The presence of $V_2$, which is higher than $V_1$, will cause FTC 33 to accelerate thereby rapidly advancing the firing angle of the next valve fired.

Prior to turn-off of the transistors 134 and 133, capacitor 129 will have been charged to a value proportional to the error signal $V_1$. Upon turn-off of transistor 134, capacitor 129 discharges through resistor 138 to a point where the diode 131 again becomes forward biased. Upon this occurrence, transistor 133 will again turn-on dropping the collector voltage of transistor 133 back to ground level and terminate the positive polarity error control signal pulse $V_2$.

In effect capacitor 129 and resistor 138 operate as a differentiating circuit to apply negative going turn-off pulses to diode 131 and the base of transistor 133. These negative going turn-off pulses are of a duration proportional to the $V_1$ error signal, and when they exceed the reference level established by resistors 122 and 123, cause transistors 134 and 133 to turn-off and produce the second output $V_2$ control pulse. Therefore, it will be appreciated that since the voltage across the capacitor 129 is determined by the collector voltage $V_c$ of transistor 121, and is proportional to the error signal $V_1$, that the interval for capacitor 129 to be discharged enough to again forward bias diode 131 and turn-on transistor 133, likewise will be proportional to the error signal. Thus, an additional control pulse $V_2$ of constant, relatively high amplitude but varying time duration that is dependent upon the value of the error signal is generated and is supplied to regulator 32 of FIG. 1 in parallel with and in addition to the normal error control signal $V_1$. This additional relatively high constant amplitude pulse then provides the volt-seconds needed to induce the fast response required to overcome the critical condition that was sensed.

From the foregoing description, it will be appreciated that the invention provides a new and improved, fast responding margin angle control method and system for power converters for assuring safe operation of such converters even under conditions where severe transient disturbances occur on the AC system and which otherwise might induce unsatisfactory operation of the converters. This result is achieved due to the design of the control which in effect samples each thyristor valve of the converter at the time it fires to determine or sense the minimum margin angle remaining following its conduction period. This sampling or sensing for the minimum margin angle occurs for each valve firing so that the smallest one for each cycle is fed to the regulator as a controlling input. Consequently, upon the occurrence of a transient disturbance, the angle of advance $\beta$ of the next valve to fire in the converter is rapidly adjusted to accommodate even severe transient disturbances which otherwise would drastically reduce the available margin angle and perhaps lead to unfavorable operation. In addition, a new and improved low cost valve current monitor is provided for use on margin angle controls incorporating the above features.

Figure 8:
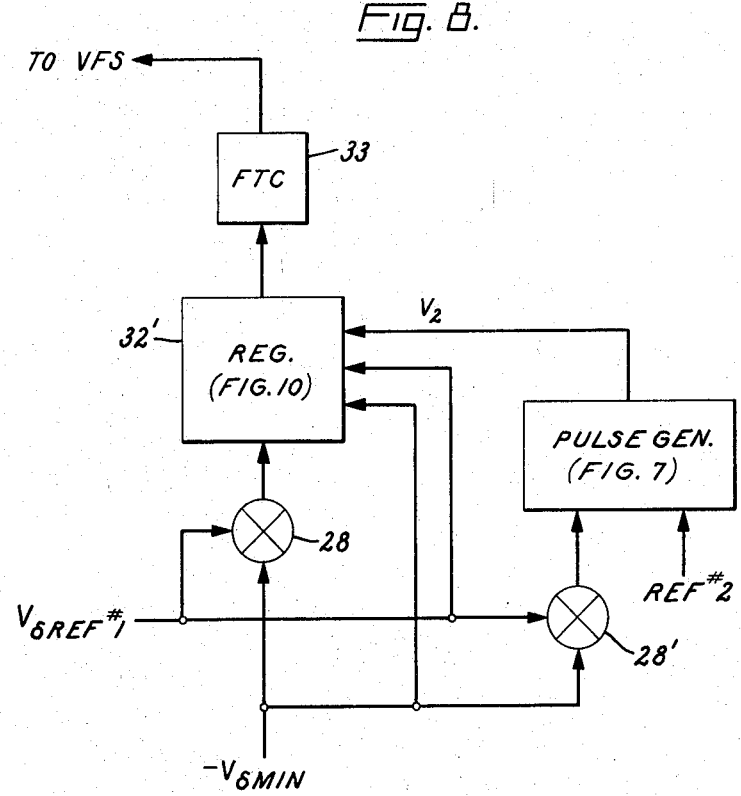
FIG. 8 is a schematic diagram of an alternative embodiment of the regulator and pulse generator blocks shown in FIG. 1.

Having described one embodiment of a new and improved fast responding margin angle control of HVDC converters having an improved valve current monitor constructed in accordance with the invention, it is believed obvious that other modifications and variations of the invention are possible in the light of the above teachings. For example, there is illustrated in FIG. 8 an alternative arrangement wherein separate error signal deriving circuits 28 and 28' are provided for the regulator and for the fast responding control pulse generator, respectively. Except for this modification, the circuits shown in FIG. 7 can be used for the block labeled "Pulse Generator" in FIG. 8. Preferably the regulator circuit 32' shown in FIG. 8 incorporates yet another feature of my invention which will next be described.

Figure 9:
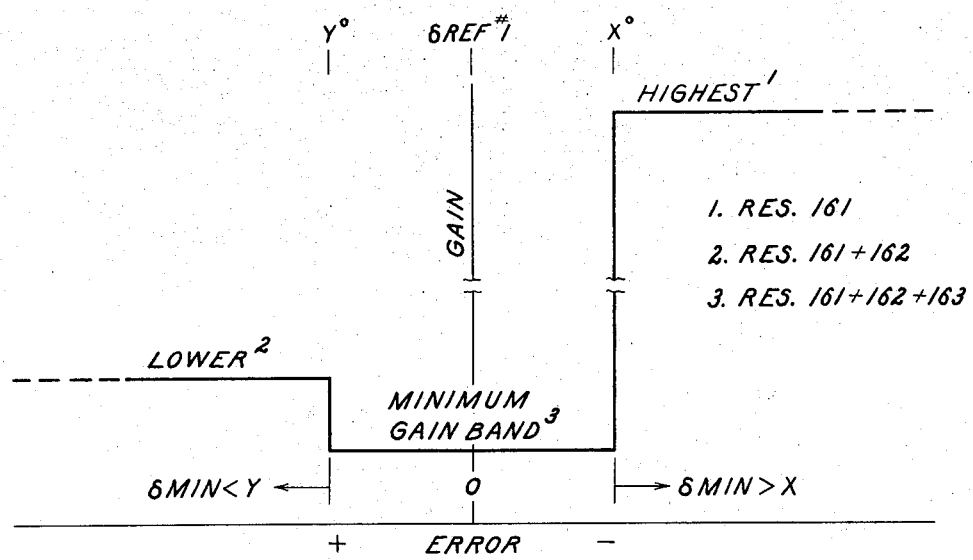
FIG. 9 is a graph of the gain v. error characteristic of the FIG. 8 embodiment.

In a manner soon to be explained, there is built into the regulator circuit 32' of FIG. 8 suitable means for controlling the gain of the regulating loop in three discrete steps as a function of the value of the error signal. The three-step operating characteristic of this modification of the previously described gain change circuit means is best illustrated in FIG. 9 where Gain is scaled along the ordinate and Error along the abscissa. So long as the selected minimum margin angle of the converter is approximately equal to the desired margin angle (e.g., 18°) there is negligible error between the relatively negative response signal $-V_{\delta\ MIN}$ (representing the actual minimum margin angle) and the positive reference signal $V_{\delta\ REF\ No.\ 1}$ (representing the desired margin angle). The gain change means operates in response to this nearly zero error condition to establish a predetermined minimum gain. As is indicated in FIG. 9, the minimum gain band extends over a range of minimum margin angles between X° and Y°, where X is a first predetermined angle greater than the reference margin angle and Y is a second predetermined angle less than the reference margin angle. If the selected minimum margin angle were larger than the first angle X° (e.g., 23°), the magnitude of the negative minimum margin angle signal will exceed that of the reference signal by a sufficient margin to cause the gain change means to establish a predetermined highest gain. With the highest gain in effect, the converter firing means rapidly retards the firing angle in order to correct the error in two or three valve firings.

On the other hand, if the minimum margin angle of the converter were smaller than the second predetermined angle Y° (e.g., 13°), the gain change means will respond to the resulting positive error by establishing another predetermined gain that is lower than the aforesaid highest gain but not as low as the aforesaid minimum gain. For reasons explained hereinbefore, the lower gain is appreciably less than (preferably about one-twelfth) the highest gain, thereby reducing an overcorrection tendency as the firing angle is progressively advanced in response to the error signal that is indicative of the subnormal minimum margin angle.

As the value of the error signal approaches zero, stable operation of the inverter is promoted by further reducing the gain of the regulating loop to the aforesaid minimum level which is even less than the lower gain. The latter reduction in gain is particularly desirable in certain circumstances where the steady state margin angle response tends to fluctuate instead of staying exactly equal to the reference margin angle signal. Such a circumstance can exist in practice where the voltage across each valve experiences multiple zero crossings due, for example, to the two serially connected bridge circuits of a 12-pulse converter being respectively associated with transformer secondaries that share a common primary.

Figure 10:
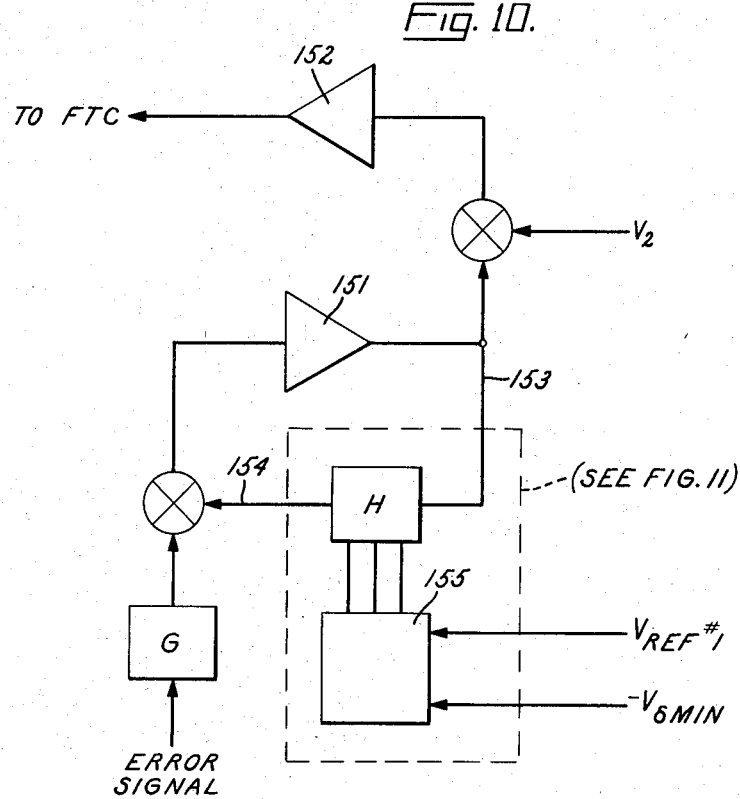
FIG. 10 is a functional block diagram of a regulator having the characteristic depicted in FIG. 9.

To implement the above-described three-step gain change feature of my invention, I prefer to use the circuitry shown in FIG. 10 which is a grossly simplified functional block diagram of only the presently pertinent components of the regulating circuit 32'. This circuit is seen to comprise first and second inverting operational amplifiers 151 and 152. The first operational amplifier 151 amplifies the error margin angle control signal. Its net forward open loop gain is represented symbolically by the block G, and its feedback transfer function is depicted by the block H in the feedback lines 153 and 154. The output of the operational amplifier 151 together with the second control pulse $V_2$ (when present) is applied to the second operational amplifier 152 whose output in turn is fed to the voltage controlled variable frequency oscillator FTC. The gain of the operational amplifier 151, and hence the gain of the whole regulating loop, depends on H which is a convenient parameter to control in the practice of my invention. Accordingly, gain change circuit means 155 is provided for automatically adjusting the magnitude of H to one of three predetermined levels as a function of the difference or error between the selected minimum margin angle feedback signal $-V_{MIN}$ and the reference signal $V_{REF\ No.\ 1}$. A useful embodiment of the gain change circuit means 155 is shown in FIG. 11.

Figure 11:
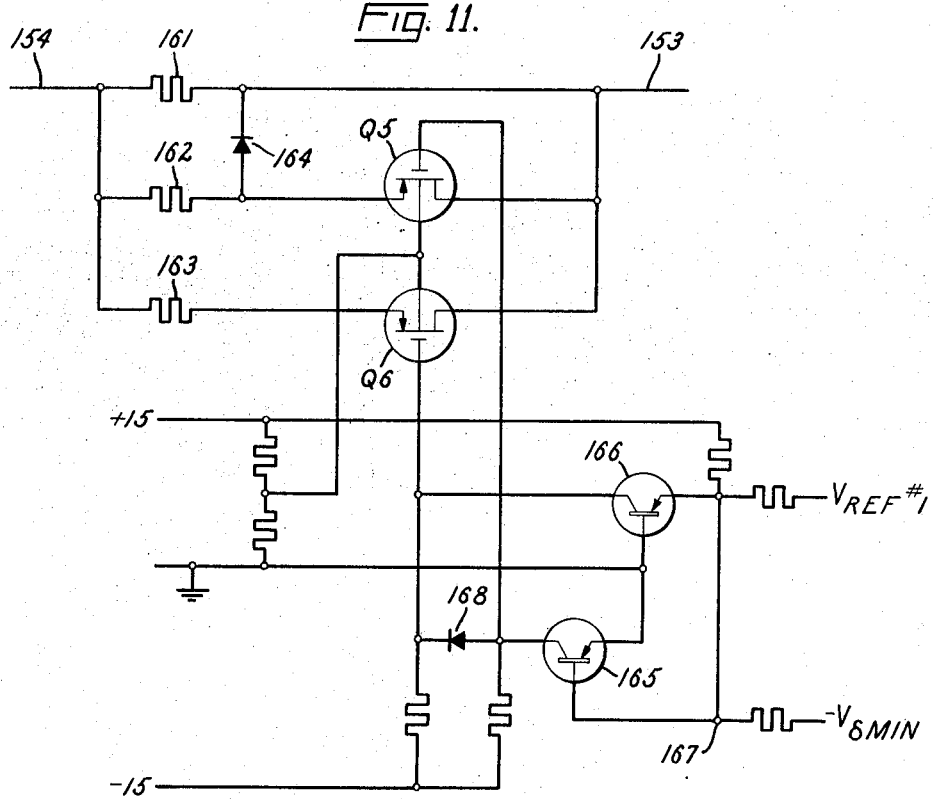
FIG. 11 is a detailed circuit diagram of a preferred form of the gain change means shown generally in FIG. 10.

In FIG. 11 the feedback circuit 153, 154 of the operational amplifier 151 is seen to include three resistors 161, 162 and 163 and a pair of bi-directional switching transistors Q5 and Q6. The resistor 161 is connected directly between the lines 153 and 154, and its ohmic resistance is selected to yield the aforesaid predetermined highest gain of the regulating loop. It is shunted by resistor 162 in series with the transistor Q5 and also by resistor 163 in series with the transistor Q6. A diode 164 is connected across Q5 as shown. When Q5 is turned on and Q6 is turned off, resistors 161 and 162 are effectively paralleled, whereby the feedback circuit resistance is lowered and the gain is reduced to the aforesaid predetermined lower level. If and when both Q5 and Q6 are turned on, all three resistors are effectively in parallel with one another, thereby further lowering the feedback circuit resistance and reducing the regulating loop gain to the predetermined minimum level.

The on and off states of the switching transistors Q5 and Q6 depend on the operation of associated transistors 165 and 166 which are controlled as a function of the value of the error signal. As is shown in FIG. 11, the base electrode of transistor 165 and the emitter of transistor 166 are connected to a common point 167 whose potential is determined by the sum of the reference signal, the negative minimum margin angle signal, and a positive bias signal. Whenever the difference between the minimum margin angle signal and the reference signal is of relatively positive polarity and of sufficient magnitude to indicate that the margin angle is smaller than the predetermined angle Y°, the resulting potential at 167 is appropriate to bias the transistor 166 on and the transistor 165 off. As a consequence of transistor 166 being on, the switching transistor Q6 is driven off, whereas so long as the transistor 165 is off the associated switching transistor Q5 is turned on by its normal forward bias. Now only the resistor 162 is effectively in parallel with resistor 161, and the predetermined lower gain is established.

When a nearly zero error condition exists (i.e., when the selected minimum margin angle is in the range between X° and Y°), the resulting potential at the common point 167 is appropriate to bias both of the transistors 165 and 166 off. Consequently both of the switching transistors Q5 and Q6 will be in their normally biased on states, both of the resistors 162 and 163 will be active, and the minimum gain band is established. If the selected minimum margin angle becomes larger than the predetermined angle X°, a sufficiently negative potential will exist at 167 to bias the transistor 165 on and the transistor 166 off. As a consequence of transistor 165 being on, the switching transistor Q5 is driven off and, via a diode 168 that is connected between the collectors of the two transistors 165 and 166, the switching transistor Q6 is also driven off. With both Q5 and Q6 off, the resistor 161 alone establishes the predetermined highest gain of the regulating loop.

It is to be understood that other changes may be made in the particular embodiments of the invention herein described which are within the full intended scope of the invention as defined by the concluding claims.

What is claimed is:

1. A margin angle control for a power converter including a combination valve current monitoring means coupled in circuit relationship with the conductivity controlled thyristor devices of a power converter for deriving valve current output electric signals representative of the current conducting periods of the respective thyristor devices, alternating current system voltage monitoring means coupled to said thyristor devices for deriving valve voltage output electric signals representative of the voltage appearing across the respective thyristor devices, the time duration of the interval between the cessation of current conduction through the respective thyristor devices and the passage through zero potential that occurs during reversal of the polarity in the voltage across the respective thyristor devices corresponding to the margin angle of the respective thyristor devices, charging circuit means responsive to said valve current monitoring means and said alternating current system voltage monitoring means for charging to a voltage value representative of the margin angle of the respective thyristor devices, means for instantaneously discharging said charging circuit means at the termination of the conducting intervals of the respective thyristor devices and in advance of charging the charging circuit means whereby the margin angle of the respective thyristor devices is freshly sampled for each conducting interval of the device and carry-over of a previous sample margin angle voltage value is eliminated, and selector circuit means responsive to all of the charging circuit means for selecting that margin angle voltage value representative of the smallest margin angle and supplying the same as an output margin angle control signal for use in controlling operation of the thyristor devices.

2. A margin angle control according to claim 1, wherein said charging circuit means includes a constant current source for linearly charging the charging circuit means to a voltage value dependent upon the time duration of the margin angle of the respective thyristor devices.

3. A margin angle control according to claim 1, further including first summing circuit means for summing together the selected smallest margin angle control signal with a first reference margin angle signal to derive an error margin angle control signal for normally controlling operation of the thyristor devices, and gain change circuit means responsive to the error margin angle control signal for reducing the gain of the normal control regulation loop of the margin angle control in response to error margin angle control signals which are indicative of a subnormal minimum margin angle.

4. A margin angle control according to claim 3, wherein said charging circuit means includes a constant current source for linearly charging the charging circuit means to a voltage value dependent upon the time duration of the margin angle of the respective thyristor devices, and further including second summing circuit means responsive to the selected smallest margin angle control signal and to a second reference signal for detecting severe changes in the smallest margin angle control signal and deriving a second output error margin angle control signal, and fast responding control means responsive to said second output error margin angle control signal for providing fast responding control over firing angles of the thyristor devices upon a severe change in the minimum margin angle. being detected.

5. A margin angle control according to claim 1, further including summing circuit means for summing together the selected smallest margin angle control signal with a first reference margin angle signal to derive an error margin angle control signal for normally controlling operation of the thyristor devices, and fast responding control signal pulse generating means operative when the selected smallest margin angle becomes smaller than a second reference margin angle value for deriving an output control pulse of constant amplitude and variable time duration dependent upon the magnitude of the error control signal and that provides fast responding control over the firing angles of the thyristor devices in response to a severe change in the minimum margin angle.

6. A margin angle control for a power converter including in combination valve current monitoring means coupled in circuit relationship with the conductivity controlled thyristor devices of a power converter for deriving valve current output electric signals representative of the current conducting period of the respective thyristor devices, alter-nating current system voltage monitoring means coupled to said thyristor devices for deriving valve voltage output electric signals representative of the voltages appearing across the respective thyristor devices, margin angle monitor means responsive to said valve current monitoring means and said alternating current system voltage monitoring means for deriving output margin angle electric signals representative of the duration of the interval between the cessation of current conduction through the respective thyristor devices and the passage through zero potential that occurs during reversal of the polarity in the voltage across the respective thyristor devices and which corresponds to the margin angle of the respective thyristor devices, charging circuit means responsive to the respective margin angle electric signals for charging to a voltage value representative of the margin angle of the respective thyristor devices, means for instantaneously discharging said charging circuit means at the termination of the conducting intervals of the respective thyristor devices and in advance of charging the charging circuit means whereby the margin angle of the respective thyristor devices is freshly sampled for each conducting interval of a device and carry-over of a previous sample margin angle voltage value is eliminated, and selector circuit means responsive to all of the charging circuit means for selecting that margin angle voltage value representative of the smallest margin angle and supplying the same as an output margin angle control signal for use in controlling operation of the thyristor devices.

7. A margin angle control according to claim 6, further including first summing circuit means for summing together the selected smallest margin angle control signal with a first reference margin angle signal to derive an error margin angle control signal for normally controlling operation of the thyristor devices, second summing circuit means responsive to the selected smallest margin angle control signal and to a second reference margin angle signal for detecting severe changes in the smallest margin angle control signal and deriving a second output error margin angle control signal, and fast responding control circuit means responsive to said second output error margin angle control signal for providing fast responding control over the operation of the thyristor devices upon a severe change in the minimum margin angle being detected.

8. A margin angle control according to claim 6, wherein said margin angle monitor means derives squarewave-shaped electric output signals whose duration is representative of the margin angle of the respective thyristor devices, said squarewave-shaped signals upon being supplied to said charging circuit means producing a saw toothed-notched waveform electric output signal whose magnitude is representative of the margin angle of the respective thyristor devices, and said selector circuit means further includes notch blanking means responsive to the selected minimum margin angle sawtoothed-notched waveform electric output signal and responsive to the squarewaved-shaped output signals supplied from the margin angle monitor means for blanking out the sawtooth-wave notch appearing in the output signal waveform from the charging circuit means whereby a substantially continuous direct current output minimum angle control signal is derived from the output of the selector circuit means.

9. A margin angle control according to claim 8, further including first summing circuit means for summing together the selected smallest margin angle control signal with a first reference margin angle signal to derive an error margin angle control signal for normally controlling operation of the converter, gain change circuit means responsive to the error margin angle control signal for reducing the gain of the normal control regulation loop in response to error margin angle control signals in the increasing direction which are indicative of increases in the minimum margin angle, and second summing circuit means responsive to the selected smallest margin angle control signal and to a second reference signal for detecting severe changes in the smallest margin angle control signal and deriving a second output error margin angle control signal, and fast responding control means responsive to said second output error margin angle control signal for providing fast responding control over the firing angles of the thyristor devices upon a severe change in the minimum margin angle being detected.

10. A margin angle control according to claim 9, wherein the power converter comprises a three-phase bridge connected converter with each bridge comprising at least six thyristor devices and having three sets of two thyristor devices connected as a valve pair for each phase of a three-phase transformer winding comprising a part of the converter, and wherein said valve current monitoring means comprises a conventional alternating current transformer inductively coupled to each valve pair, valve current signal shaping and separating circuit means coupled to the respective current transformers of each valve pair for squarewave-shaping the signals produced thereby and separating the signals into two separate signals representative of the conduction intervals of each of the respective thyristor devices comprising the valve pair, and delay means coupled to the respective signal wave shaping and separating circuit means for extending the duration of the square-wave-shaped electric signals produced thereby by a predetermined amount to include and drown out spurious signal pulses induced in the current transformer windings as a result of thyristor device turn-off and the like to thereby obviate the production of false and erraneous output current conduction indicating signal pulses.

11. A margin angle control according to claim 10, wherein the value of the first and second reference margin angle signals are adjusted to compensate for the extended duration of the valve current signal pulses produced as a result of the delay introduced in the valve current signal shaping and separating circuit means.

12. A margin angle control according to claim 11, wherein the power converter comprises a high voltage direct current to alternating current and alternating current to direct current converter capable of operation in either an inverting or rectifying mode.

13. A margin angle control for a power converter including in combination valve current monitoring means coupled in circuit relationship with the conductivity controlled thryistor devices of a power converter for deriving valve current output electric signals representative of the current conducting periods of the respective thyristor devices, alternating current system voltage monitoring means coupled to said thyristor devices for deriving valve voltage output electric signals representative of the voltage appearing across the respective thyristor devices, the duration of the interval between the cessation of current conduction through the respective thyristor devices and the passage through zero potential that occurs during reversal of the polarity in the voltage across the respective thyristor devices corresponding to the margin angle of the respective thyristor devices, margin angle signal deriving means responsive to said valve current monitoring means and said alternating current system voltage monitoring means for deriving output margin angle signals representative of the margin angles of the respective thyristor devices, selector circuit means responsive to said margin angle signal deriving means for selecting that margin angle signal representative of the smallest margin angle, first summing circuit means for summing together the selected smallest margin angle control signal with a first reference margin angle signal to derive an error margin angle control signal for normally controlling operation of the thyristor devices, second summing circuit means responsive to the selected smallest margin angle control signal and to a second reference signal for detecting severe changes in the smallest margin angle control signal and deriving a second output error margin angle control signal, and fast responding control circuit means responsive to said second output error margin angle control signal for providing fast responding control over the operation of the thyristor devices upon a severe change in the minimum margin angle being detected.

14. A margin angle control according to claim 13, wherein the power converter comprises a three-phase bridge connected converter with each bridge comprising at least six thyristor devices and having three sets of two thyristor devices connected as a valve pair for each phase of a three-phase transformer supply winding comprising a part of the converter and wherein said valve current monitoring means comprises a conventional alternating current transformer inductively coupled to each valve pair, valve current signal shaping and separating circuit means coupled to the respective current transformers of each valve pair for squarewave-shaping the signals produced thereby and separating the signals into two separate signals representative of the conduction intervals of each of the respective thyristor devices comprising the valve pair, and delay means coupled to the respective valve current signal wave shaping and separating circuit means for extending the duration of the squarewave-shaped electric signals produced thereby by a predetermined amount to include and drown out spurious overshoot signal pulses induced in the current transformer windings as a result of thyristor device turn-off and the like to thereby obviate the production of false and erroneous output valve current conduction indicating signal pulses.

15. A margin angle control according to claim 14, further including means for compensating for the extended time duration of the valve current output squarewave electric signal pulses representative of the current conducting periods of the respective thyristor devices in the power converter.

16. A low cost valve current monitor for a three-phase bridge connected power converter with each bridge comprising at least six thyristor devices and having three sets of two thyristor devices connected as a valve pair for each phase of a three-phase transformer winding comprising a part of the bridge power converter, said valve current monitor comprising an alternating current current transformer inductively coupled to each valve pair of the bridge power converter, valve current signal shaping and separating circuit means coupled to the respective current transformers of each valve pair for squarewave-shaping the signals produced thereby and separating the signals into two separate signals representative of the conduction intervals of each of the respective thyristor devices comprising the valve pair, and delay means coupled to the respective signal wave shaping and separating circuit means for extending the duration of the squarewave-shaped electric signals produced thereby by a predetermined amount to include and drown out spurious signal pulses induced in the current transformer windings as a result of thyristor device turn-off and the like to thereby obviate the production of false or erroneous valve current conduction indicating signal pulses.

17. A low cost valve current monitor according to claim 16 further including means to compensate for the extended time duration of the valve durrent signal pulses produced as a result of the delay introduced in the valve current signal shaping and separating circuit means.

18. In combination: a converter comprising a plurality of electric current conducting valves connected in a bridge configuration between AC and DC electric power conductors, said valves being arranged to be cyclically fired in a predetermined sequence; controllable firing means for sequentially firing said valves at desired firing angles; means for deriving output margin angle signals representative of the margin angles of the respective valves of said bridge; selector circuit means responsive to said margin angle signal deriving means for selecting that margin angle signal representative of the smallest margin angle; summing circuit means for summing together the selected smallest margin angle signal with a reference margin angle signal to derive an error signal for normally controlling operation of said controllable firing means so as to advance or to retard the firing angles as required to minimize said error; fast responding control circuit means operative to provide additional control over the operation of said controllable firing means, said fast responding control circuit means being effective, when operative, to cause said controllable firing means rapidly to advance said firing angle an amount proportional to the magnitude of said error signal; and means for activating operation of said fast responding control circuit in immediate response to the selected smallest margin angle decreasing to a predetermined level below the level of the reference margin angle established by said reference margin angle signal, whereby a severe reduction in the smallest margin angle is rapidly corrected by the operation of said fast responding control circuit means.

19. In combination: a converter comprising a plurality of electric current conducting valves connected in a bridge configuration between AC and DC electric power conductors, said valves being arranged to be cyclically fired in a predetermined sequence; controllable means for sequentially firing said valves at desired firing angles; means for deriving output margin angle signals representative of the margin angles of the respective valves of said bridge; selector circuit means responsive to said margin angle signal deriving means for selecting that margin angle signal representative of the smallest margin angle; summing circuit means for summing together the selected smallest margin angle signal with a reference margin angle signal to derive an error signal for normally controlling operation of said firing means so as to advance or to retard the firing angles as required to minimize said error, and gain change circuit means for reducing the gain of the regulating loop comprising the converter, the margin angle signal deriving means, the summing circuit means, and the controllable firing circuit means in response to an error signal indicative of the selected minimum margin angle being smaller than a predetermined amount established by the reference margin angle signal whereby tendency to overshoot and oscillation of the system about a zero error condition is minimized.

20. The method of controlling a converter comprised by a plurality of electric current conducting thyristor valves connected in a bridge configuration between AC and DC electric power conductors and arranged to be cyclically fired in a predetermined sequence, the method comprising deriving output margin angle signals representative of the margin angles of the respective thyristor valves of the bridge immediately following each thyristor valve current conduction interval, clearing previously sensed and stored margin angle signals immediately in advance of sensing and holding a new margin angle signal for a respective valve resulting from the latest valve firing, sensing and storing the actual value of each margin angle signal resulting from the latest thyristor valve firing with no carry-over from one firing to the next to provide a freshly up-dated margin angle signal sample associated with each individual valve firing, continuously sampling the stored margin angle signals and selecting that signal representative of the minimum margin angle for controlling the firing angles of the thyristor valves in a fast responding manner.

21. The method according to claim 20, further comprising comparing the selected minimum margin angle signal to a pre-set reference signal and deriving an error control signal for advancing or retarding the firing angles of the individual thyristor valves so as to reduce the magnitude of the error control signal towards zero, and differentially treating the error control signal whereby the gain of the overall control is increased for changes in the minimum margin angle in the increasing direction and overshoot and oscillation of the control about a zero error condition is minimized.

22. The method according to claim 21, further comprising effectively comparing the selected minimum margin angle signal to a second pre-set reference signal and deriving a second control signal that is proportional to the magnitude of said error signal for quickly advancing the firing angles of the thyristor valves in response to the second pre-set reference signal being exceeded.

23. The method according to claim 20, further comprising comparing the selected minimum margin angle signal to a pre-set normal reference signal and deriving an error control signal that is proportional to the difference for advancing or retarding the firing angles of the individual thyristor valves so as to reduce the magnitude of the error control signal towards zero, and deriving a control signal pulse for additionally advancing said firing angles an increment dependent upon the magnitude of said error signal in response to sensing a margin angle smaller than a predetermined critical minimum margin angle value.

24. In combination: a converter comprising a plurality of electric current conducting valves connected in a bridge configuration between AC and DC electric power conductors, said valves being arranged to be cyclically fired in a predetermined sequence; controllable means for sequentially firing said valves at desired firing angles; means for deriving output margin angle signals representative of the actual margin angles of the respective valves of said bridge; selector circuit means connected to said margin angle signal deriving means for selecting that margin angle signal representative of the minimum actual margin angle; summing circuit means for comparing the selected minimum margin angle signal with a reference signal representative of a desired margin angle to derive an error signal indicative of the difference therebetween, said firing means being responsive to said error signal for advancing or retarding the firing angles as required to minimize said difference, and gain change circuit means for controlling the gain of the regulating loop comprising the converter, the margin angle signal deriving means, the summing circuit means, and the controllable firing means as a function of the value of said error signal, said gain change circuit means being operative to establish a predetermined minimum gain when the error signal is indicative of a nearly zero error condition and to establish a predetermined highest gain whenever the selected minimum margin angle is larger than a first predetermined angle.

25. The combination according to claim 24 wherein said gain change circuit means is also operative to establish a predetermined gain that is lower than said highest gain but not as low as said minimum gain whenever the selected minimum margin angle is smaller than a second predetermined angle which is less than said desired margin angle.

26. The combination according to claim 25 wherein said gain change circuit means is operative to establish said predetermined minimum gain whenever the selected minimum margin angle is in a range between said first and second angles.

27. A valve current monitor for at least one pair of alternately conducting electric valves adapted to be connected to one phase of a polyphase electric power system by means of an alternating current conductor in which current will flow in one direction when one valve of said pair is conducting and in the opposite direction when the other valve is conducting, said current monitor comprising an alternating current transformer inductively coupled to said conductor, valve current signal shaping and separating circuit means coupled to said current transformer for squarewave-shaping the signals that are induced in the secondary thereof as a result of valve current and for producing two separate output signals representative of the intervals that the respective valves of the valve pair are conducting forward currents, and delay means coupled to the signal wave shaping and separating circuit means and operative upon the commencement of the squarewave-shaped electric signals for delaying the start of each of said output signals until the corresponding valve current indicating signal has persisted for a predetermined length of time.

28. A valve current monitor according to claim 27 in which said signal wave shaping and separating circuit means includes additional means operative upon the termination of the squarewave-shaped electric signals for extending the duration of each of the output signals by a predetermined amount.

29. A valve current monitor for at least one pair of alternately conducting electric valves adapted to be connected to one phase of a polyphase electric power system by means of an alternating current conductor in which current will flow in one direction when one valve of said pair is conducting and in the opposite direction when the other valve is conducting, said current monitor comprising a current transformer inductively coupled to said conductor, and valve current signal shaping and separating circuit means coupled to said current transformer for squarewave-shaping the signals induced therein and producing two separate output signals representing respectively the forward current conducting intervals of the two valves comprising said pair, said signal shaping and separating circuit means including cross-coupling means operative whenever either one of said two output signals is being produced for inhibiting the other output signal.

30. The value current monitor according to claim 29, further including delay means operative upon the termination of the squarewave-shaped electric signals for extending the duration of each of the output signals by a predetermined amount.

31. The valve current monitor according to claim 29, further including delay means coupled to the signal shaping and separating circuit means and operative upon the commencement of the squarewave-shaped electric signals for delaying the start of each of said output signals until the signal induced in said current transformer has persisted for a predetermined length of time.

32. The valve current monitor according to claim 31, further including means coupled to said signal shaping and separating circuit means and operative upon the termination of the squarewave-shaped electric signals for extending the duration of each of said output signals by a predetermined amount.

* * * * *